(12) United States Patent
Stone et al.

(10) Patent No.: US 10,611,030 B2
(45) Date of Patent: Apr. 7, 2020

(54) COMPLIANT END EFFECTORS, ROBOTS THAT INCLUDE COMPLIANT END EFFECTORS, AND METHODS OF UTILIZING THE SAME

(71) Applicant: The Boeing Company, Chicago, IL (US)

(72) Inventors: Paul R. Stone, Federal Way, WA (US); Gregory Louis Clark, Issaquah, WA (US); Clayton Lynn Munk, Maple Valley, WA (US); Mario A. Mendez, Renton, WA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 15/939,974

(22) Filed: Mar. 29, 2018

(65) Prior Publication Data

US 2018/0222053 A1    Aug. 9, 2018

Related U.S. Application Data

(62) Division of application No. 14/742,441, filed on Jun. 17, 2015, now Pat. No. 9,962,834.

(51) Int. Cl.
*B25J 9/16*         (2006.01)
*B25J 15/00*        (2006.01)
(Continued)

(52) U.S. Cl.
CPC ............. *B25J 9/1687* (2013.01); *B23P 19/04* (2013.01); *B25J 15/0028* (2013.01);
(Continued)

(58) Field of Classification Search
CPC ........ B25J 9/1687; B25J 9/1697; B25J 15/12; B25J 15/0616; B25J 15/0028; B64F 5/10;
(Continued)

(56) References Cited

U.S. PATENT DOCUMENTS 2,963,927 A   12/1960   Hanger
3,052,462 A    9/1962   Butler
(Continued)

FOREIGN PATENT DOCUMENTS

JP    S51 39859    4/1976
JP    H05 44519    6/1993
(Continued)

OTHER PUBLICATIONS

Machine generated English language translation of abstract for JP 2012 066368, downloaded from Espacenet.com on Apr. 12, 2017.
(Continued)

*Primary Examiner* — John C Hong
(74) *Attorney, Agent, or Firm* — DASCENZO Intellectual Property Law, P.C.

(57) ABSTRACT

Compliant end effectors, robots that include compliant end effectors, and methods of utilizing the same. The robots include a robotic arm and the compliant end effector. The compliant end effector includes a base, a jaw fixedly coupled to the base, a part-engaging surface, and a pivot structure. The pivot structure extends between the part-engaging surface and the jaw and is configured to permit limited rotation of the part-engaging surface relative to the jaw about a single pivot axis. The methods include locating an apparatus with a vision system of the robot, locating a part with the vision system, gripping the part with the compliant end effector, positioning the part relative to the apparatus, and operatively attaching the part to the apparatus. The positioning includes deliberately contacting a toe end of a flange of the part with the apparatus prior to contacting a heel end of the flange with the apparatus.

20 Claims, 8 Drawing Sheets

(51) Int. Cl.
  *B64F 5/50* (2017.01)
  *B64F 5/10* (2017.01)
  *B23P 19/04* (2006.01)
  *B25J 15/06* (2006.01)
(52) U.S. Cl.
  CPC .............. *B25J 15/0616* (2013.01); *B64F 5/10* (2017.01); *B64F 5/50* (2017.01); *Y10S 901/02* (2013.01); *Y10S 901/39* (2013.01)
(58) Field of Classification Search
  CPC .......... B64F 5/50; B23P 19/04; Y10S 901/02; Y10S 901/39
  See application file for complete search history.

(56) References Cited

U.S. PATENT DOCUMENTS

| | | | |
|---|---|---|---|
| 4,240,621 A | 12/1980 | Daddato | |
| 4,745,681 A | 5/1988 | Hollis, Jr. et al. | |
| 5,031,304 A * | 7/1991 | Shepard | B23P 19/102 29/700 |
| 5,456,007 A * | 10/1995 | Bove | B23P 19/006 137/625.69 |
| 5,848,859 A | 12/1998 | Clark et al. | |
| 6,170,157 B1 | 1/2001 | Munk et al. | |
| 6,314,630 B1 | 11/2001 | Munk et al. | |
| 6,412,845 B1 | 7/2002 | Sawdon et al. | |
| 6,413,022 B1 | 7/2002 | Sarh | |
| 6,779,272 B2 | 8/2004 | Day et al. | |
| 7,645,106 B2 | 1/2010 | Gordon | |
| 10,399,221 B2 * | 9/2019 | Kobayashi | B25J 9/1633 |

FOREIGN PATENT DOCUMENTS

| | | |
|---|---|---|
| JP | 2001 105374 | 4/2001 |
| JP | 2012 066368 | 4/2012 |
| KR | 100 926 534 | 11/2009 |

OTHER PUBLICATIONS

Machine generated English language translation of abstract for KR 100 926 534, downloaded from Espacenet.com on Apr. 12, 2017.
U.S. Appl. No. 14/614,866, filed Feb. 5, 2015, Brockway et al.
Machine generated English language translation of abstract for JP 2001 105374, downloaded from Espacenet.com on Apr. 12, 2017.

* cited by examiner

COMPLIANT END EFFECTORS, ROBOTS THAT INCLUDE COMPLIANT END EFFECTORS, AND METHODS OF UTILIZING THE SAME

RELATED APPLICATION

This application claims priority to United States Provisional patent application Ser. No. 14/742,441, entitled "COMPLIANT END EFFECTORS, ROBOTS THAT INCLUDE COMPLIANT END EFFECTORS, AND METHODS OF UTILIZING THE SAME," which was filed on Jun. 17, 2015, and the complete disclosure of which is hereby incorporated by reference.

FIELD

The present disclosure relates generally to compliant end effectors, to robots that include the compliant end effectors, and to methods of utilizing the compliant end effectors.

BACKGROUND

Robots and robotic systems are often used in manufacturing processes, such as in automotive and aerospace manufacturing. Such robots often perform tasks such as welding, painting, fastening, assembling, moving large loads, inspecting, and testing. In specific applications, robots may pick up a part, move the part toward an apparatus, position the part with respect to an apparatus, and/or couple the part to the apparatus. Such tasks performed by robots often require precision and/or accuracy, and the robot must be able to precisely align or locate itself and/or a tool with respect to the part and/or apparatus in order to ensure that it is able to perform its task. For example, in determinant assembly processes, alignment holes (sometimes referred to as determinant assembly holes, or "DA holes") pre-formed in, for example, a flange of the part (e.g., a rib post for an airplane wing assembly) are aligned with holes formed in the apparatus, for example, the wing assembly, in order to position the part. Typically, a first robot, having a gripping mechanism may hold the part in position, while a second robot may fasten the flange of the part to the assembly. However, such parts are not always perfectly formed, and may have variances within acceptable tolerances. For example, rib posts may be formed having a flange oriented with respect to a spar within a tolerance of plus or minus 1.5 degrees. When held rigidly in place by the first robot's gripping mechanism, the part may be temporarily deformed into alignment with the assembly, but once the gripping mechanism is released, the part may spring away from the location in which it was held, thereby changing a relative location of the rib post away from a desired location. Thus, there exists a need for compliant end effectors and for methods of utilizing the compliant end effectors.

SUMMARY

Compliant end effectors, robots that include compliant end effectors, and methods of utilizing the same are disclosed herein. The robots include a robotic arm and the compliant end effector. The compliant end effector includes a base, a jaw fixedly coupled to the base, a part-engaging surface, and a pivot structure. The pivot structure extends between the part-engaging surface and the jaw and is configured to permit limited rotation of the part-engaging surface relative to the jaw about a single pivot axis.

The methods include locating an apparatus within a vision system of the robot, locating a part within the vision system, gripping the part with the compliant end effector, positioning the part relative to the apparatus, and operatively attaching the part to the apparatus. The positioning includes operatively contacting the part with the apparatus and deliberately contacting a toe end of a flange of the part with the apparatus prior to contacting a heel end of the flange with the apparatus.

DESCRIPTION

Figure 1:
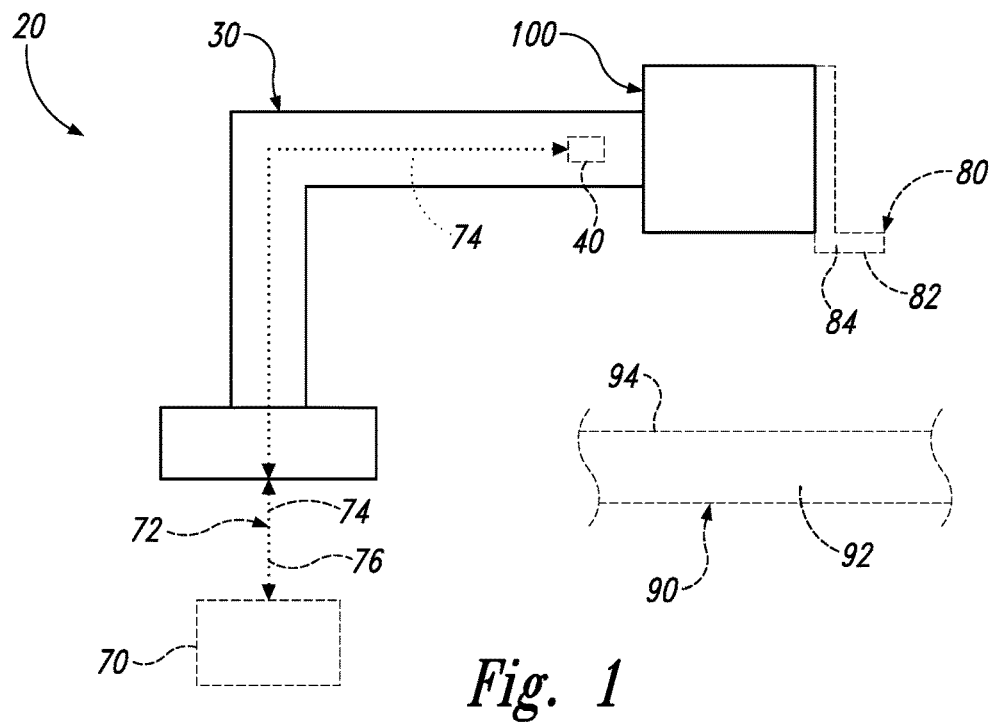
FIG. 1 is a schematic representation of a robot that includes a compliant end effector according to the present disclosure.

FIGS. 1-15 provide examples of compliant end effectors 100, according to the present disclosure, and/or of robots 20 and/or methods 200 that include and/or utilize compliant end effectors 100. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic representation of a robot 20 that includes a robotic arm 30 and a compliant end effector 100 according to the present disclosure. Robot 20 may be adapted, configured, designed, constructed, and/or programmed to operatively attach and/or affix a part 80 to an apparatus 90. As an example, part 80 may include a flange 84, and robot 20 may be configured to operatively contact flange 84 with a surface 94 of apparatus 90 to permit operative attachment of part 80 to apparatus 90, as discussed in more detail herein. As another, more specific, example, part 80 may include and/or be a rib post 82 and apparatus 90 may include and/or be an aircraft 92, or at least a portion of aircraft 92.

As illustrated in dashed lines in FIG. 1, robot 20 further may include a vision system 40. Vision system 40 may be operatively coupled to robotic arm 30, as illustrated; however, this is not required in all embodiments. In addition, vision system 40 may be adapted, configured, designed, constructed, and/or programmed to generate a location signal 74. Location signal 74 may be indicative of, may define, and/or may quantify a position of part 80 relative to apparatus 90.

As also illustrated in dashed lines in FIG. 1, robot 20 further may include, may be associated with, and/or may be in communication with a controller 70. Controller 70 may be adapted, configured, designed, constructed, and/or programmed to control the operation of at least a portion of robot 20. This may include performing and/or directing robot 20 to perform at least a portion of methods 200, which are discussed in more detail herein. As more specific examples, controller 70 may be adapted, configured, designed, constructed, and/or programmed to control the operation of robotic arm 30, to receive information from robotic arm 30, to control the operation of compliant end effector 100, to receive information from compliant end effector 100, to control the operation of vision system 40, and/or to receive information, such as location signal 74, from vision system 40.

Controller 70 may be programmed to provide a control signal 76 to robotic arm 30, to vision system 40, and/or to compliant end effector 100 to control the operation thereof. As examples, control signal 76 may include and/or be a signal for transitioning compliant end effector 100 to an open orientation (as discussed in more detail herein), a signal for transitioning compliant end effector 100 to a gripping orientation to grip part 80 (as discussed in more detail herein), a signal for moving robotic arm 30 to a first position for gripping part 80, a signal for moving robotic arm 30 to a second position in which part 80 is in operative contact with apparatus 90, and/or an overdrive signal for pressing part 80 against apparatus 90.

Robot 20 and/or controller 70 further may include, be associated with, and/or be in communication with a communication linkage 72. Communication linkage 72 may extend between controller 70 and robot 20, may extend between controller 70 and robotic arm 30, may extend between controller 70 and compliant end effector 100, and/or may extend between controller 70 and vision system 40. Communication linkage 72 may be configured to convey location signal 74 and/or control signal 76. Examples of communication linkage 72 include any suitable wired communication linkage 72 and/or any suitable wireless communication linkage 72.

Controller 70 may include any suitable structure that may be adapted, configured, designed, constructed, and/or programmed to automatically control the operation of at least a portion of robot 20. As examples, controller 70 may include and/or be an electronic controller, a dedicated controller, a special-purpose controller, a personal computer, a display device, a logic device, and/or a memory device. In addition, controller 70 may be programmed to perform one or more algorithms to automatically control the operation of robot 20. This may include algorithms that may be based upon and/or that may cause controller 70 to direct robot 20 to perform methods 200 of FIG. 15.

Figure 2:
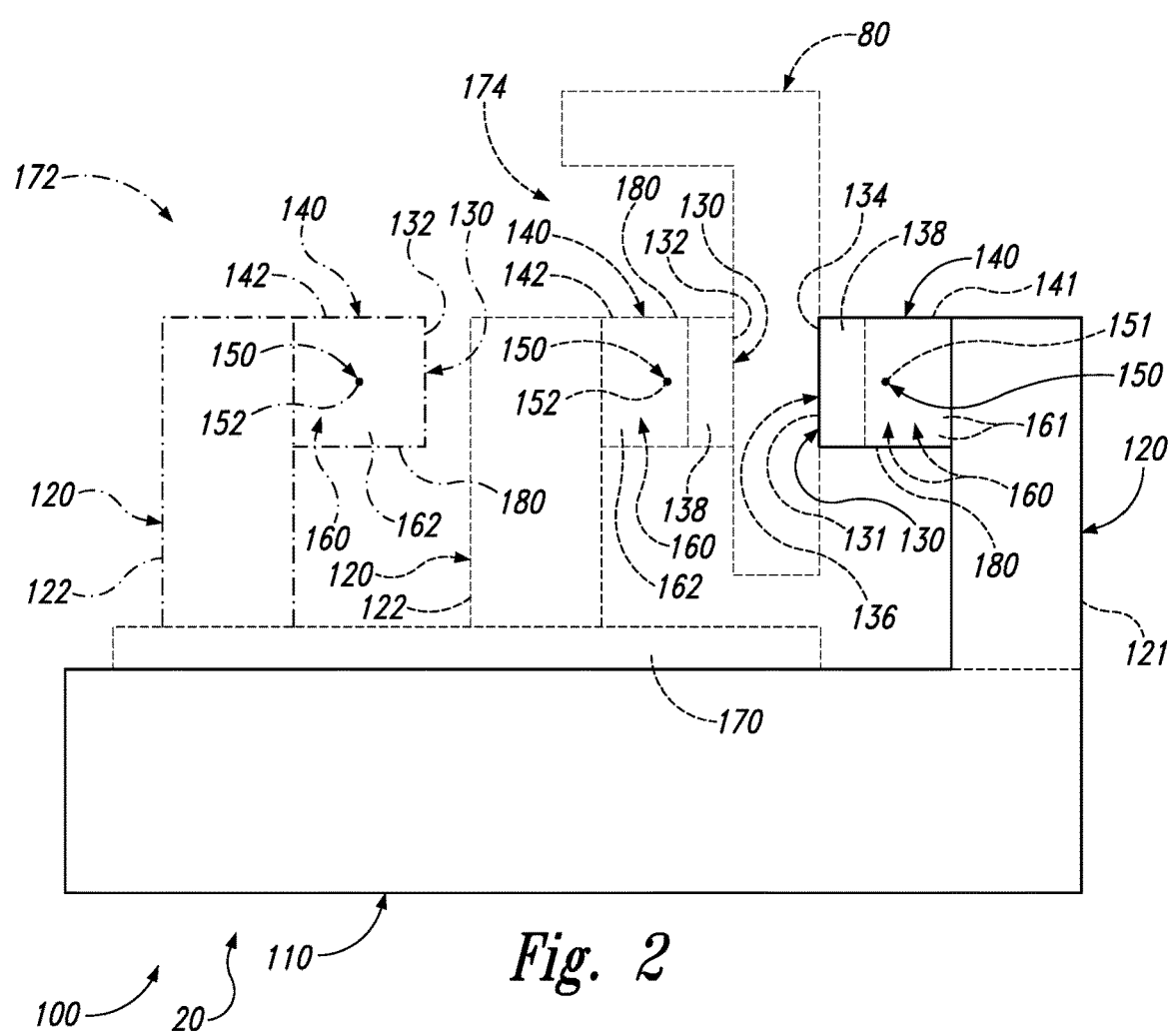
FIG. 2 is a schematic representation of a compliant end effector according to the present disclosure.

FIG. 2 is a schematic representation of a compliant end effector 100 according to the present disclosure. Compliant end effector 100 of FIG. 2 may be utilized to selectively retain, located, and/or place a part 80, as discussed herein.

Compliant end effector 100 of FIG. 2 may include and/or be compliant end effector 100 of FIG. 1, and any of the structures, components, features, and/or functions that are discussed herein with reference to compliant end effector 100 of FIG. 2 may be included in and/or utilized with robot 20 of FIG. 1 and/or compliant end effector 100 thereof without departing from the scope of the present disclosure. Similarly, any of the structures, components, features, and/or functions that are discussed herein with reference to compliant end effector 100 of FIG. 1 may be included in and/or utilized with compliant end effector 100 of FIG. 2 without departing from the scope of the present disclosure.

As illustrated in FIG. 2, compliant end effector 100 includes a base 110 and a jaw 120. Jaw 120 may be fixedly coupled to base 110 and/or may not be configured for motion relative to base 110.

Compliant end effector 100 also includes and/or defines a part-engaging surface 130 and a pivot structure 140. Part-engaging surface 130 may be configured to operatively contact, or engage, part 80 when part 80 is selectively retained by compliant end effector 100. Pivot structure 140 may extend between part-engaging surface 130 and jaw 120 and may be configured to permit limited rotation of part-engaging surface 130 relative to jaw 120 about a single pivot axis 150.

In some embodiments, compliant end effector 100 may be configured to selectively retain part 80 utilizing a single part-engaging surface 130. As an example, part-engaging surface 130 may include and/or be a vacuum surface 134. Under these conditions, part-engaging surface 130 and/or vacuum surface 134 thereof may be configured to selectively retain part 80 via a vacuum force, which may be generated by at least partial evacuation of an interface region 136 between part 80 and vacuum surface 134.

Additionally or alternatively, compliant end effectors 100, according to the present disclosure, may include two part-engaging surfaces 130 and may be configured to selectively retain part 80 between the two part-engaging surfaces 130. As an example, and as illustrated in dashed lines in FIG. 2, compliant end effector 100 may include a first jaw 121, a second jaw 122, a first part-engaging surface 131, a second part-engaging surface 132, a first pivot structure 141, a second pivot structure 142, and a jaw actuator 170.

In these embodiments, first pivot structure 141 may extend between and/or operatively attach first jaw 121 and first part-engaging surface 131. Similarly, second pivot structure 142 may extend between and/or operatively attach second jaw 122 and second part-engaging surface 132. In addition, first pivot structure 141 may be configured to permit limited rotation of first part-engaging surface 131 relative to first jaw 121 about a first single pivot axis 151. Similarly, second pivot structure 142 may be configured to permit limited rotation of second part-engaging surface 132 relative to second jaw 122 about a second single pivot axis 152. First single pivot axis 151 may be parallel, or at least substantially parallel, to second single pivot axis 152. In addition, first jaw 121 may be fixed, or at least substantially fixed, while second jaw 122 and/or second part-engaging surface 132 may be configured to move relative to first jaw 121 via jaw actuator 170.

As illustrated, first part-engaging surface 131 and second part-engaging surface 132 may face toward one another and/or may be arranged to operatively contact, or grip, opposed sides of part 80. In addition, second jaw 122 may be movedly, translatingly, and/or rotationally coupled to base 110 via jaw actuator 170. Additionally or alternatively, it is within the scope of the present disclosure that second part-engaging surface 132 may be movedly, translatingly, and/or rotationally coupled to second jaw 122 via jaw actuator 170. Regardless of the exact configuration, jaw actuator 170 may be configured to selectively transition compliant end effector 100, second jaw 122, and/or second part-engaging surface 132 among a range of orientations that includes an open orientation 172, as illustrated in dash-dot lines in FIG. 2, and a gripping orientation 174, as illustrated in dashed lines in FIG. 2. When compliant end effector 100 is in open orientation 172, first part-engaging surface 131 may be distal, or relatively distal, from second part-engaging surface 132. Additionally or alternatively, and when in open orientation 172, compliant end effector 100 may be oriented and/or configured to permit part 80 to be located between first part-engaging surface 131 and second part-engaging surface 132.

In contrast, when compliant end effector 100 is in gripping orientation 174, first part-engaging surface 131 may be proximal, or relatively proximal, to second part-engaging surface 132. As an example, and when second jaw 122 is in gripping orientation 174, first-part-engaging surface 131 may be proximal to second part-engaging surface 132 when compared to open orientation 172. Additionally or alternatively, and when in gripping orientation 174, compliant end effector 100 may be configured to grip part 80 between first part-engaging surface 131 and second part-engaging surface 132.

Jaw actuator 170 may include and/or be any suitable structure that may be adapted, configured, designed, and/or constructed to selectively transition compliant end effector 100 and/or second jaw 122 thereof between at least open orientation 172 and gripping orientation 174. As examples, jaw actuator 170 may include and/or be a linear actuator, such as a pneumatic cylinder, a hydraulic cylinder, a solenoid assembly, a rack and pinion assembly, a lead screw and nut assembly a ball screw assembly, a linear motor, a linear track and carriage, and/or a linear guide assembly. When jaw actuator 170 includes, or is, a linear actuator, it is within the scope of the present disclosure that jaw actuator 170 further may be configured to limit, restrict, or even block rotation of second part-engaging surface 132. Jaw actuator 170 also may include and/or be a rotational actuator, such as a pivot point.

It is within the scope of the present disclosure that compliant end effector 100 and/or jaw actuator 170 thereof further may be configured to control, regulate, and/or limit a gripping force that is applied to part 80 by first part-engaging surface 131 and second part-engaging surface 132 when compliant end effector 100 is gripping the part. Such a configuration may permit and/or facilitate rotation of first part-engaging surface 131 and/or second part-engaging surface 132 about first single pivot axis 151 and/or second single pivot axis 152, respectively, when compliant end effector 100 is utilized to operatively attach part 80 to an apparatus. This is discussed in more detail herein.

Pivot structure 140, such as first pivot structure 141 and/or second pivot structure 142, may include any suitable structure that may be adapted, configured, designed, shaped, sized, and/or constructed to permit limited rotation of part-engaging surface 130, such as first part-engaging surface 131 and/or second part-engaging surface 132. This may include permitting limited rotation relative to jaw 120, such as first jaw 121 and/or second jaw 122, about single pivot axis 150, such as first single pivot axis 151 and/or second single pivot axis 152. In addition, pivot structure 140 further may be configured to limit, restrict, and/or block rotation of part-engaging surface 130 relative to jaw 120 about another pivot axis, about any other pivot axis, and/or about any pivot axis other than single pivot axis 150. Stated another way, a given pivot structure 140 only may permit limited, or even any, rotation about single pivot axis 150 and/or may not be configured to permit rotation about an axis, about any axis, and/or about every axis that is not parallel to and/or coextensive with single pivot axis 150.

An example of pivot structure 140 includes a pair of spherical bearings 160. Thus, and in the example of FIG. 2, first pivot structure 141 may include a first pair of spherical bearings 161. Similarly, second pivot structure 142 may include a second pair of spherical bearings 162. Spherical bearings 160 are discussed in more detail herein with reference to FIGS. 10-14.

As illustrated in dashed lines in FIG. 2, compliant end effector 100 further may include one or more standoff structures 180. Standoff structure 180, when present, may be configured to extend at least partially between jaw 120 and part-engaging surface 130, may operatively interconnect jaw 120 with part-engaging surface 130, may operatively interconnect jaw 120 with pivot structure 140, and/or may operatively interconnect pivot structure 140 with part-engaging surface 130. Additionally or alternatively, pivot structure 140 may be at least partially, or even completely, enclosed within standoff structure 180.

Part-engaging surface 130, including first part-engaging surface 131 and/or second part-engaging surface 132, may include any suitable structure that may be adapted, configured, designed, and/or constructed to engage, operatively engage, contact, and/or grip part 80. It is within the scope of the present disclosure that part-engaging surface 130 may be at least partially, or even completely, defined by pivot structure 140 and/or that part-engaging surface 130 may form a portion of pivot structure 140. Additionally or alternatively, it is also within the scope of the present disclosure that compliant end effector 100 further may include a part-engaging pad 138 that at least partially, or even completely, defines part-engaging surface 130. Under these conditions, part-engaging pad 138 may be operatively attached to pivot structure 140 and/or pivot structure 140 may operatively couple part-engaging pad 138 to jaw 120. Examples of part-engaging surface 130 include rigid, or at least substantially rigid, part-engaging surface 130.

Examples of part-engaging pad 138 include a metallic part-engaging pad, a steel part-engaging pad, and/or a stainless steel part-engaging pad.

Jaw 120, including first jaw 121 and/or second jaw 122, may include and/or have any suitable structure, shape, and/or configuration that may operatively interconnect base 110 and pivot structure 140. As illustrated, jaw 120 may extend from base 110. This may include extending perpendicularly, or at least substantially perpendicularly from, base 110; however, this is not required. As discussed, jaw 120, or first jaw 121 when compliant end effector 100 includes both first jaw 121 and second jaw 122, may be fixed. As such, jaw 120 and/or first jaw 121 may form a portion of and/or may be defined by base 110. Additionally or alternatively, jaw 120 and/or first jaw 121 may be operatively attached to base 110. This is indicated by the dashed line separating base 110 from jaw 120 in FIG. 2. Jaw 120 may be formed and/or defined from, or by, any suitable material or materials. As examples, jaw 120 may include and/or be a metallic jaw, a steel jaw, and/or a stainless steel jaw.

Base 110 may include any suitable structure that support jaw 120, including first jaw 121 and/or second jaw 122, that may operatively interconnect first jaw 121 and second jaw 122, and/or that may be operatively interconnected with a remainder of robot 20, as illustrated in FIG. 2. Base 110 may include and/or be a rigid, or at least substantially rigid, base 110. Additionally or alternatively, base 110 may include and/or be a metallic base, a steel base, and/or a stainless steel base.

Figure 3:
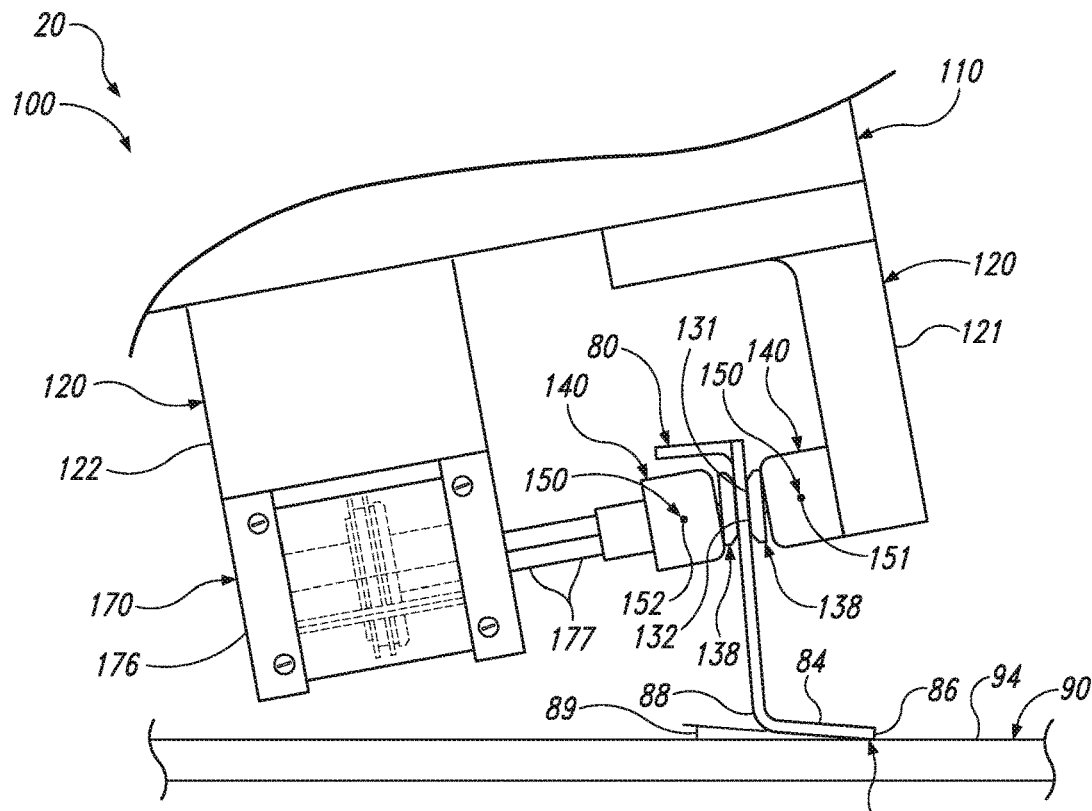
FIG. 3 is a less schematic side view of a robot that includes a compliant end effector, according to the present disclosure, positioning a part within an apparatus.
Figure 4:
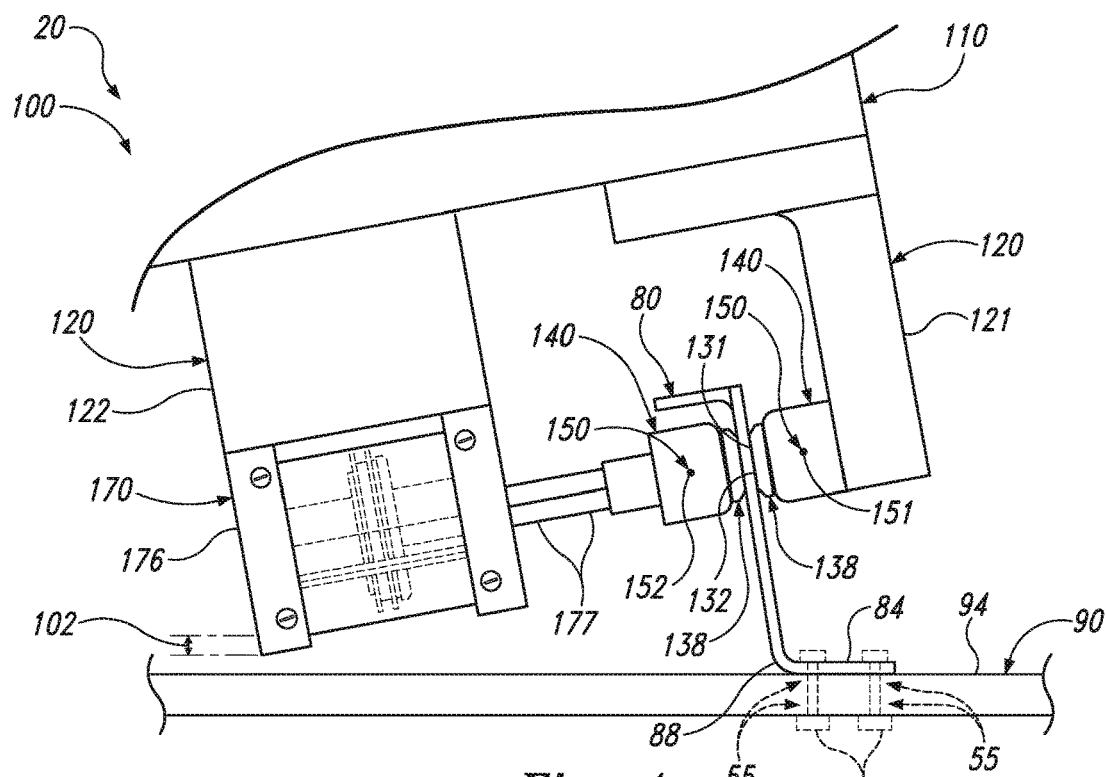
FIG. 4 is another less schematic side view of a robot that includes a compliant end effector, according to the present disclosure, positioning a part within an apparatus.
Figure 5:
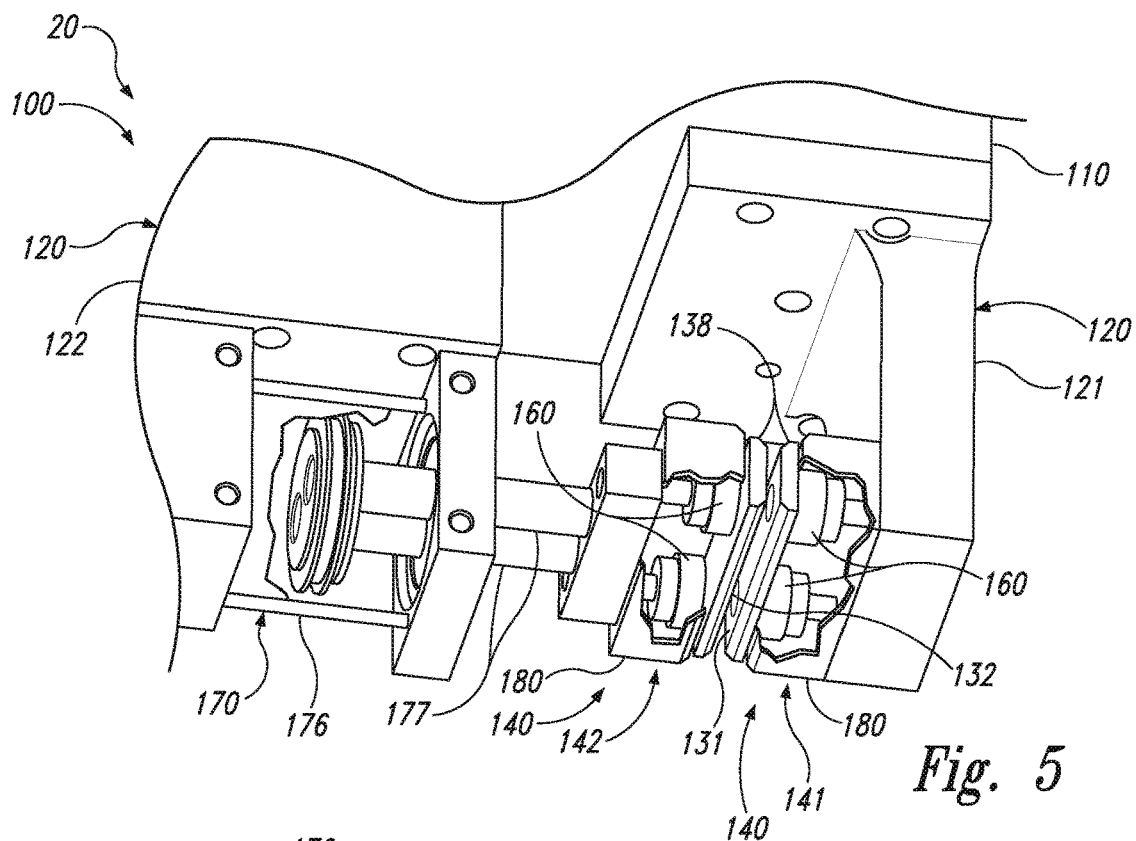
FIG. 5 is a partially cut-away view of the compliant end effector of FIG. 3.

FIGS. 3-4 are less schematic side views of a robot 20 that includes a compliant end effector 100, according to the present disclosure, positioning a part 80 on a surface 94 of an apparatus 90. FIG. 5 is a partially cut-away view of compliant end effector 100 of FIGS. 3-4. Compliant end effector 100 of FIGS. 3-5 may include and/or be compliant end effector 100 of FIGS. 1-2, and any of the structures, components, features, and/or functions that are discussed herein with reference to compliant end effector 100 of FIG. 3-5 may be included in and/or utilized with compliant end effector 100 of FIGS. 1-2 without departing from the scope of the present disclosure. Similarly, any of the structures, components, features, and/or functions that are discussed herein with reference to compliant end effector 100 of FIGS. 1-2 may be included in and/or utilized with compliant end effector 100 of FIGS. 3-5 without departing from the scope of the present disclosure.

As illustrated, compliant end effector 100 includes a base 110 and a pair of jaws 120, including a first jaw 121 and a second jaw 122. Compliant end effector 100 further includes a jaw actuator 170, in the form of a pneumatic cylinder 176 and a pair of pivot structures 140, including a first pivot structure 141 and a second pivot structure 142. As perhaps illustrated most clearly in FIG. 5, pneumatic cylinder 176 includes a pair of rods 177 that operatively attach to second pivot structure 142 and that operatively restrict, limit, and/or block rotation of second pivot structure 142 about an axis that is parallel to rods 177.

As illustrated in FIGS. 3-4, first pivot structure 141 defines a first single pivot axis 151, while second pivot structure 142 defines a second single pivot axis 152. In addition, first pivot structure 141 operatively interconnects a first part-engaging surface 131 with base 110, while second pivot structure 142 operatively interconnects a second part-engaging surface 132 with base 110.

As perhaps illustrated most clearly in FIG. 5, compliant end effector 100 includes a pair of standoff structures 180 that at least partially contain and/or house respective pivot structures 140. Pivot structures 140 include a pair of spherical bearings 160. Pivot structures 140 that include spherical bearings 160 are discussed in more detail herein with reference to FIGS. 10-11. As illustrated in FIGS. 3-5, part-engaging surfaces 130 are defined by respective part-engaging pads 138.

As discussed herein with reference to FIG. 1 and illustrated in FIGS. 3-4, part 80 may include a flange 84, and robot 20 may be configured to operatively contact flange 84 with surface 94. Flange 84 may include and/or define a toe end 86 and a heel end 88, and robot 20 may be programmed to orient part 80 such that toe end 86 deliberately contacts surface 94 prior to contact between surface 94 and heel end 88. Stated another way, and as illustrated in FIG. 3, robot 20 may be programmed to orient part 80 such that a finite angle 89 is established between flange 84 and surface 94 of apparatus 90 immediately subsequent to contact between toe end 86 and surface 94 of apparatus 90.

Examples of finite angle 89 include angles of at least 0.1 degrees, at least 0.2 degrees, at least 0.3 degrees, at least 0.4 degrees, at least 0.5 degrees, at least 0.6 degrees, at least 0.7 degrees, at least 0.8 degrees, at least 0.9 degrees, at least 1 degree, at least 1.2 degrees, at least 1.4 degrees, at least 1.6 degrees, at least 1.8 degrees, and/or at least 2 degrees. Additional examples of finite angle 89 include angles of less than 10 degrees, less than 9 degrees, less than 8 degrees, less than 7 degrees, less than 6 degrees, less than 5 degrees, less than 4 degrees, less than 3.5 degrees, less than 3 degrees, less than 2.8 degrees, less than 2.6 degrees, less than 2.4 degrees, less than 2.2 degrees, and/or less than 2 degrees.

In such a configuration, toe end 86 may form and/or define an initial line of contact 99 (i.e., a line of contact that runs along a length of toe end 86) with surface 94, as illustrated in FIG. 3, and compliant end effector 100 may be configured such that single pivot axes 150, including a first single pivot axis 151 of first pivot structure 141 and/or second single pivot axis 152 of second pivot structure 142, are parallel, or at least substantially parallel, to initial line of contact 99. This relative orientation among initial line of contact 99, first single pivot axis 151, and second single pivot axis 152 may permit part 80 to rotate, via rotation of pivot structures 140 about pivot axes 150, such that heel end 88 comes into contact with surface 94 of apparatus 90, as illustrated in FIG. 4. This rotation of part 80 may permit consistent, reliable, and/or reproducible face-to-face contact between flange 84 and surface 94, thereby improving a positional accuracy of robots 20 that include and/or utilize compliant end effector 100. The rotation of part 80 about pivot axes 150 may be a result of an application of an overdrive force to part 80 by robot 20 and is discussed in more detail herein with reference to methods 200 of FIG. 15. This overdrive force may be applied via motion of end effector 100 over an overdrive distance 102 (as illustrated in FIG. 4). Examples of the overdrive distance are discussed herein with reference to methods 200 of FIG. 15. In addition, a gripping force that is applied to part 80 by compliant end effector 100 may be controlled and/or regulated to facilitate rotation of part 80 upon application of the overdrive force, as also discussed herein with reference to methods 200 of FIG. 15.

As illustrated in dashed lines in FIG. 4, and subsequent to alignment of part 80 on surface 94 of apparatus 90, one or more fasteners 50 may be placed within one or more holes 55 within part 80 and/or apparatus 90. Such fasteners 50 may operatively attach part 80 to apparatus 90 subsequent to release of part 80 by compliant end effector 100.

Figure 6:
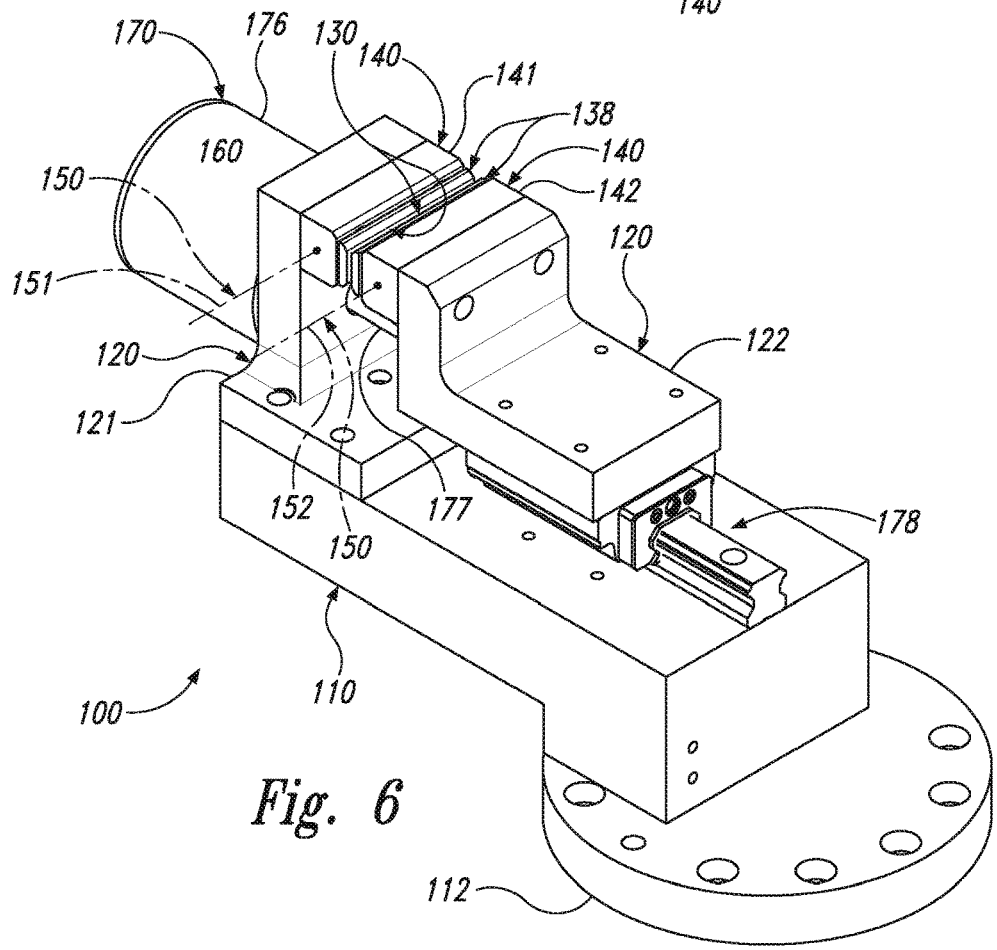
FIG. 6 is a less schematic view of a compliant end effector according to the present disclosure.
Figure 7:
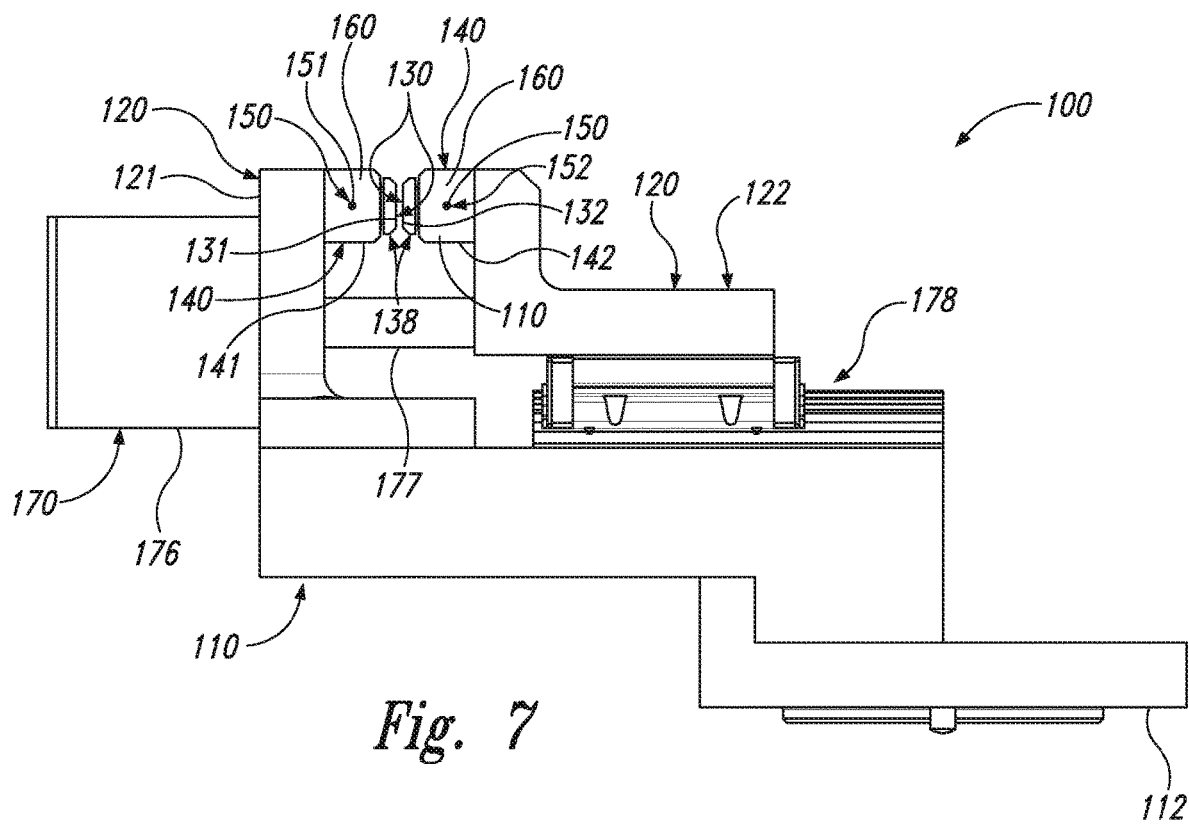
FIG. 7 is a less schematic side view of the compliant end effector of FIG. 6.
Figure 8:
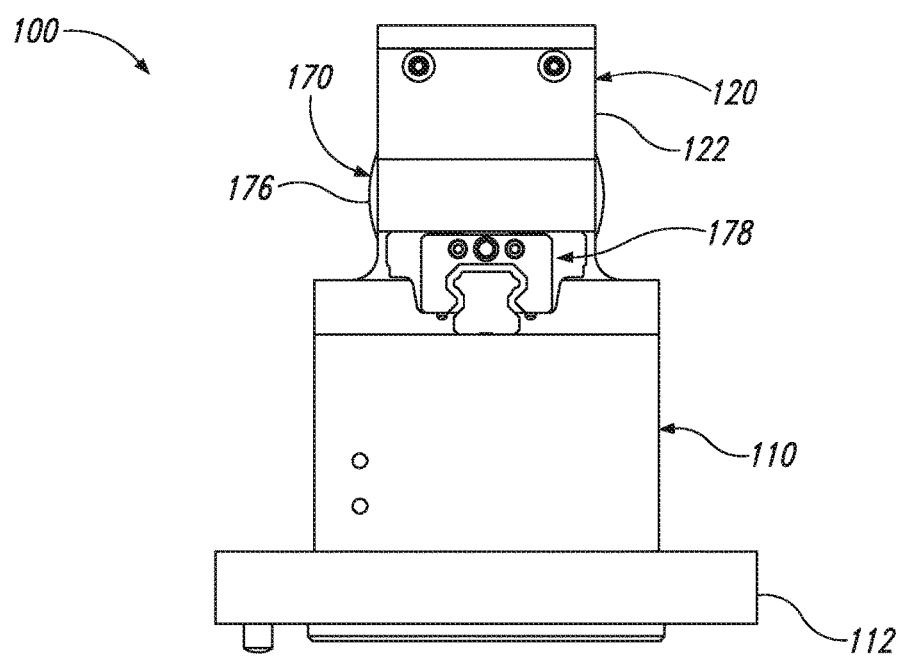
FIG. 8 is a less schematic end view of the compliant end effector of FIGS. 6-7.
Figure 9:
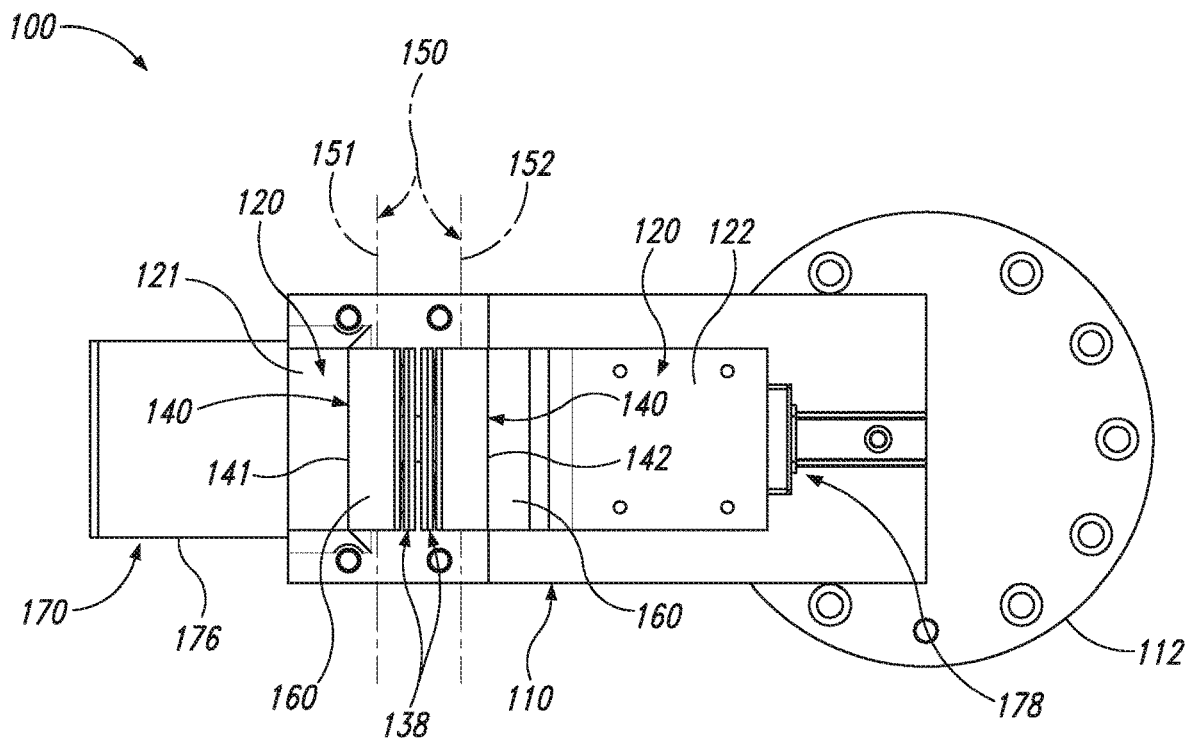
FIG. 9 is a less schematic top view of the compliant end effector of FIGS. 6-8.

FIG. 6 is a less schematic view of another compliant end effector 100 according to the present disclosure. FIG. 7 is a less schematic side view of the compliant end effector of FIG. 6, FIG. 8 is a less schematic end view of the compliant end effector of FIGS. 6-7, and FIG. 9 is a less schematic top view of the compliant end effector of FIGS. 6-8. Compliant end effector 100 of FIGS. 6-9 may include and/or be compliant end effector 100 of FIGS. 1-2, and any of the structures, components, features, and/or functions that are discussed herein with reference to compliant end effector 100 of FIG. 6-9 may be included in and/or utilized with compliant end effector 100 of FIGS. 1-2 without departing from the scope of the present disclosure. Similarly, any of the structures, components, features, and/or functions that are discussed herein with reference to compliant end effector 100 of FIGS. 1-2 may be included in and/or utilized with compliant end effector 100 of FIGS. 6-9 without departing from the scope of the present disclosure.

As illustrated in FIGS. 6-9, compliant end effector 100 includes a base 110 that includes a mounting point 112 that is configured for operative attachment to a robot, such as robot 20 of FIG. 1. Compliant end effector 100 also includes a pair of jaws 120, including a first jaw 121 and a second jaw 122. First jaw 121 is fixedly attached to base 110, while second jaw 122 is slidingly attached to base 110 via a jaw actuator 170 that includes both a pneumatic cylinder 176 and a linear guide assembly 178. Linear guide assembly 178 also may be referred to herein as profile rails 178, a dovetail assembly 178, and/or a square rail and bearing assembly 178 and permits linear motion of second jaw 122 relative to base 110 along a length of the linear guide assembly. Pneumatic cylinder 176 includes a rod 177 that is operatively attached to second jaw 122 and is actuated to move second jaw 122 along the length of linear guide assembly 178, such as between open orientation 172 and gripping orientation 174, as illustrated in FIG. 2.

Compliant end effector 100 of FIGS. 6-9 further includes a pair of pivot structures 140. Pivot structures 140 include a first pivot structure 141, which is configured to rotate about a first single pivot axis 151, and a second pivot structure 142, which is configured to rotate about a second single pivot axis 152. First single pivot axis 151 and second single pivot axis 152 generally may be referred to herein as single pivot axes 150.

As further illustrated in FIGS. 6-9, compliant end effector 100 also includes a pair of part-engaging pads 138. Part-engaging pads 138 are operatively attached to respective pivot structures 140 and define respective part-engaging surfaces 130, including a first part-engaging surface 131 and a second part-engaging surface 132. Pivot structures 140 include a pair of spherical bearings 160. Pivot structures 140 that include spherical bearings 160 are discussed in more detail herein with reference to FIGS. 10-11.

Figure 10:
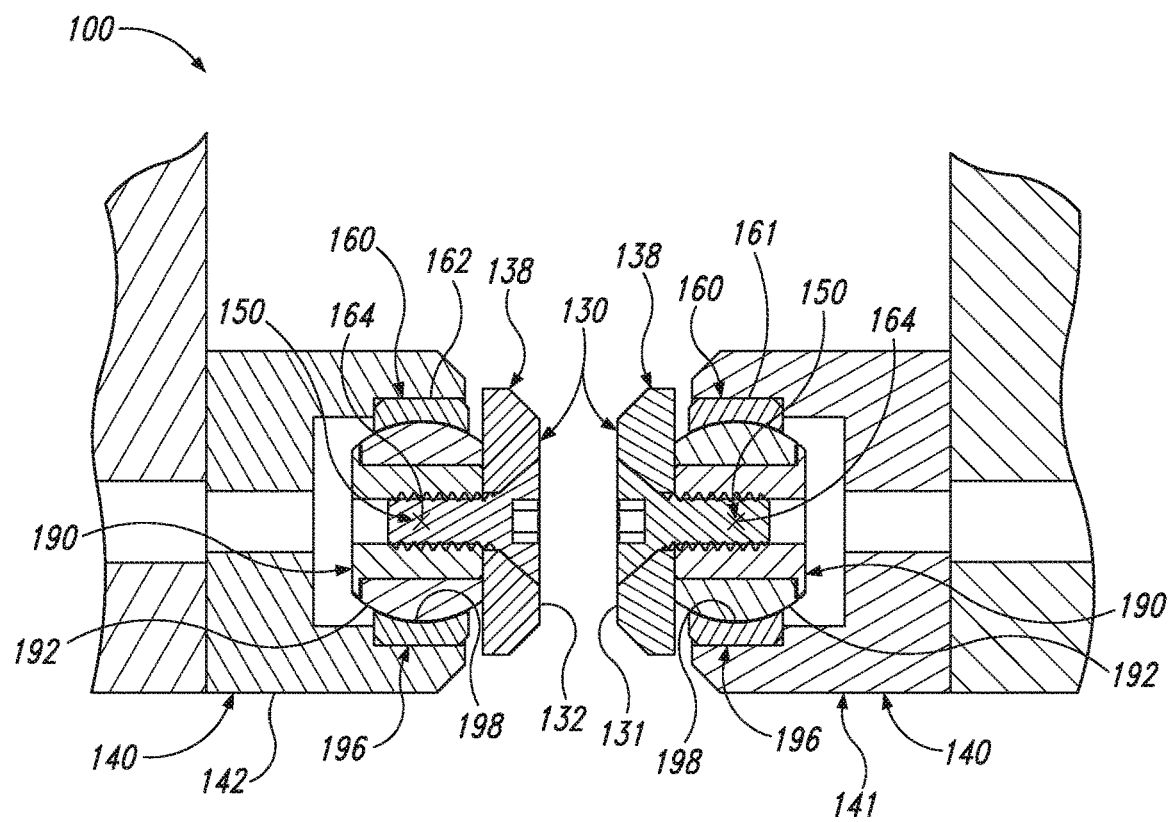
FIG. 10 is a less schematic cross-sectional view of a pivot structure that may be utilized with a compliant end effector according to the present disclosure.
Figure 11:
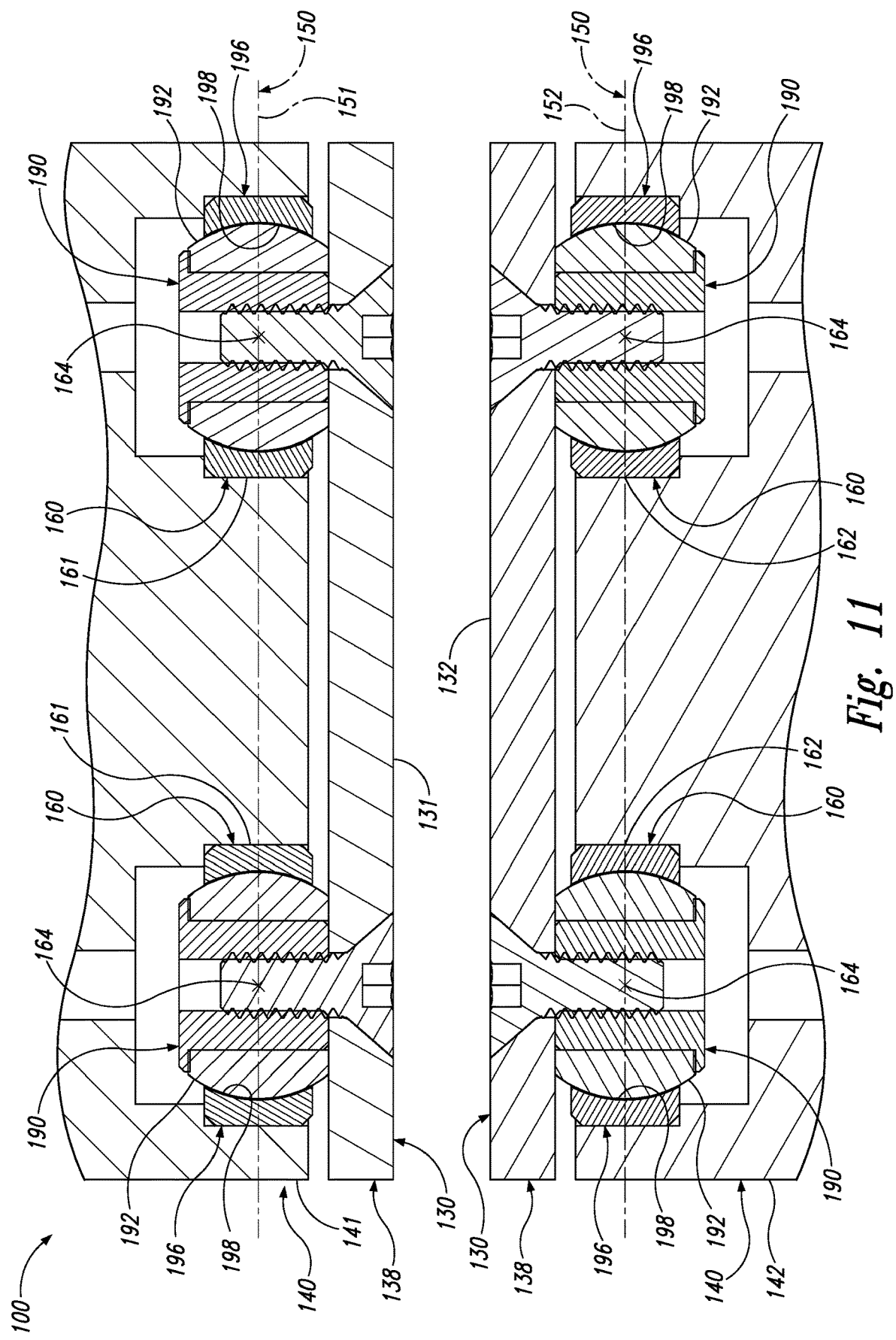
FIG. 11 is a less schematic cross-sectional view of a pivot structure that may be utilized with a compliant end effector according to the present disclosure.

FIGS. 10-11 are examples of pivot structures 140 that include spherical bearings 160 and that may be included in and/or utilized with compliant end effectors 100 according to the present disclosure. Pivot structure 140 of FIGS. 10-11 may include and/or be pivot structure 140 of FIGS. 2-4 and 6-9, and any of the structures, components, features, and/or functions that are discussed herein with reference to pivot structure 140 of FIG. 10-11 may be included in and/or utilized with pivot structure 140 of FIGS. 2-4 and 6-9 without departing from the scope of the present disclosure. Similarly, any of the structures, components, features, and/or functions that are discussed herein with reference to pivot structure 140 of FIGS. 10-11 may be included in and/or utilized with pivot structure 140 of FIGS. 10-11 without departing from the scope of the present disclosure.

FIG. 10 is a less schematic longitudinal cross-sectional view of pivot structure 140, while FIG. 11 is a less schematic transverse cross-sectional view of pivot structure 140. As perhaps illustrated most clearly in FIGS. 10-11, each pivot structure 140, such as a first pivot structure 141 and/or a second pivot structure 142, may include a pair of spherical bearings 160. This may include a first pair of spherical bearings 161 for first pivot structure 141 and a second pair of spherical bearings 162 for second pivot structure 142. Each spherical bearing 160 defines a center of rotation 164. As discussed, each pivot structure 140 defines a single pivot axis 150, and single pivot axis 150 may pass through center of rotation 164 of each spherical bearing 160 in the pair of spherical bearings 160.

Each pair of spherical bearings 160 may be operatively attached to a part-engaging pad 138 that defines a respective part-engaging surface 130 and may be arranged along a longitudinal axis of the part-engaging surface. In addition, and as discussed, part-engaging pad 138 may be rigid, or at least substantially rigid. As such, and even though a single spherical bearing 160 might be configured to rotate about a plurality of different axes, the pair of spherical bearings 160 of a given pivot structure 140 is constrained to rotate only about a respective single pivot axis 150.

Each spherical bearing 160 may include an inner ring 190 that defines, or has, an at least partially spherical outer surface 192. Each spherical bearing 160 further may include an outer ring 196 that defines, or has, an at least partially spherical inner surface 198. Outer surface 192 of inner ring 190 may be opposed to and/or in contact with inner surface 198 of outer ring 196 such that inner ring 190 is permitted to rotate relative to outer ring 196 about at least one rotational axis, about two orthogonal rotational axes, or about three orthogonal rotational axes.

However, and as discussed, the operative attachment of part-engaging pad 138 to spherical bearings 160 may limit rotation of a given pair of spherical bearings 160 to a given single pivot axis 150. In addition, and as illustrated, the operative attachment to part-engaging pad 138 also may limit and/or restrict rotation about the given single pivot axis 150 to an angular range. As examples, the angular range may be at least 0.2 degrees, at least 0.4 degrees, at least 0.6 degrees, at least 0.8 degrees, at least 1 degree, at least 1.2 degrees, at least 1.4 degrees, at least 1.6 degrees, at least 1.8 degrees, at least 2 degrees, at least 2.5 degrees, at least 3 degrees, at least 4 degrees, and/or at least 5 degrees. Additionally or alternatively, the angular range also may be less than 15 degrees, less than 12.5 degrees, less than 10 degrees, less than 8 degrees, less than 6 degrees, less than 5 degrees, less than 4 degrees, less than 3 degrees, and/or less than 2 degrees. A magnitude of the angular range may be selected and/or determined based upon a size and/or extent of part-engaging pad 138 and/or on a distance between part-engaging pad 138 and a remainder of pivot structure 140.

Figure 12:
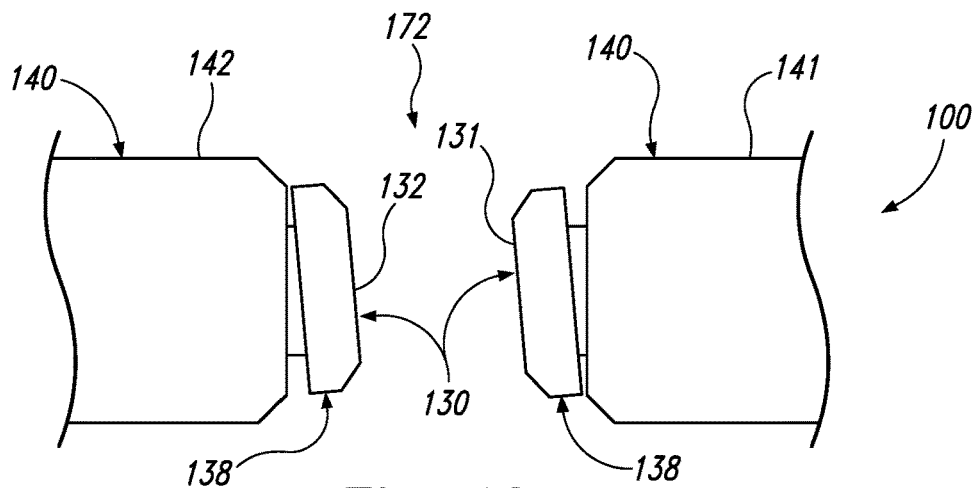
FIG. 12 is a schematic side view of a portion of a compliant end effector, according to the present disclosure, in an open orientation.
Figure 13:
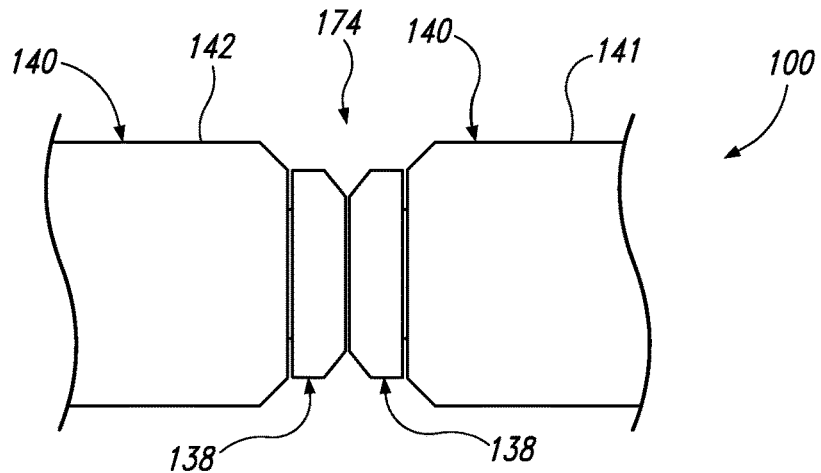
FIG. 13 is a schematic side view of a portion of a compliant end effector, according to the present disclosure, in a gripping orientation.
Figure 14:
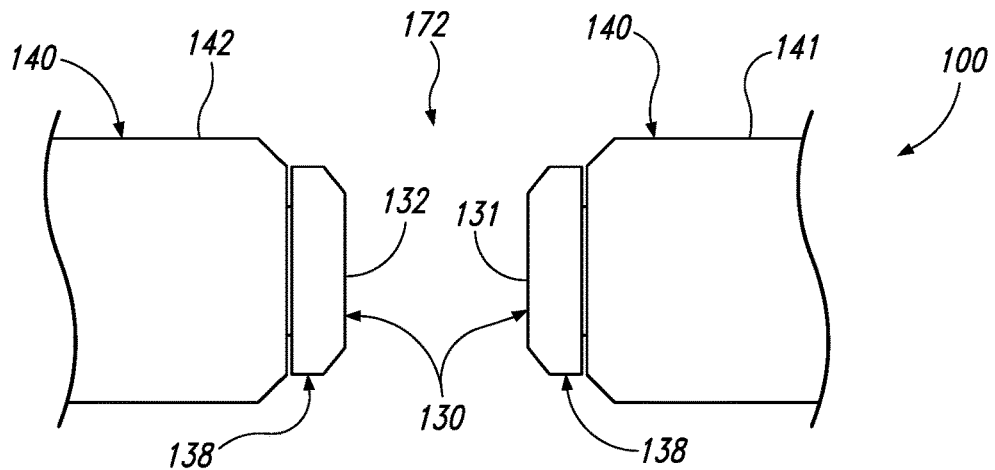
FIG. 14 is another schematic side view of a portion of a compliant end effector, according to the present disclosure, in an open orientation.

FIGS. 12-14 are schematic side views of a portion of a compliant end effector 100, according to the present disclosure. As illustrated, compliant end effector 100 includes a pair of pivot structures 140, including a first pivot structure 141 and a second pivot structure 142. Compliant end effector 100 also includes a pair of opposed part-engaging pads 138 that have, or define, corresponding part-engaging surfaces 130, including a first part-engaging surface 131 and a second part-engaging surface 132. As illustrated in FIG. 12, compliant end effector 100 initially may be in an open orientation 172. In addition, first part-engaging surface 131 and second part-engaging surface 132 may have an unknown, unspecified, and/or random relative orientation.

Figure 15:
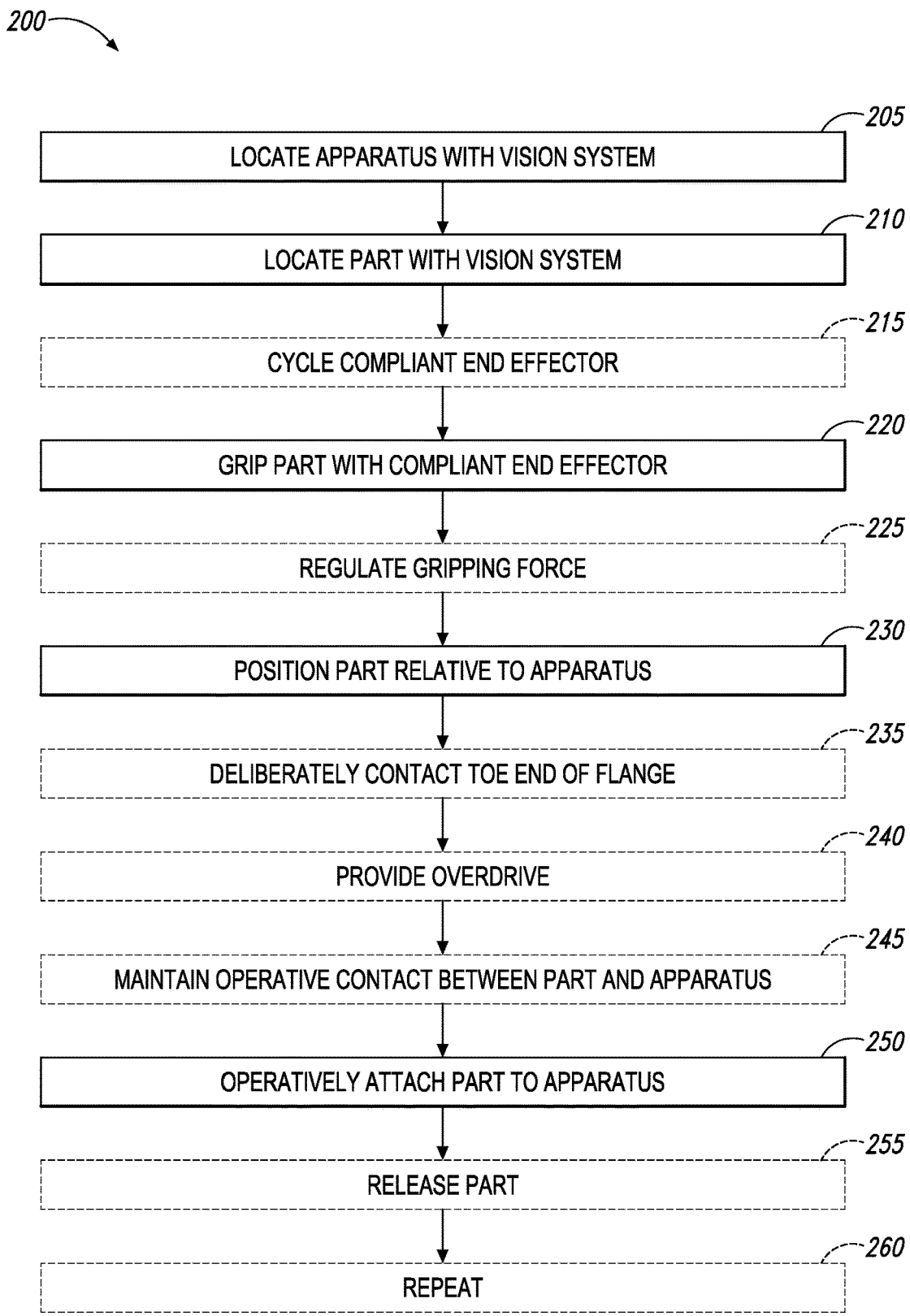
FIG. 15 is a flowchart depicting methods, according to the present disclosure, of automated aircraft component assembly.

However, and as discussed herein with reference to methods 200 of FIG. 15, the systems and methods according to the present disclosure may include cycling compliant end effector 100 between open orientation 172, as illustrated in FIG. 12, and a gripping orientation 174, as illustrated in FIG. 13. Such cycling may operatively align first part-engaging surface 131 with second part-engaging surface 132 and/or may place first part-engaging surface 131 and second part-engaging surface 132 in a predetermined relative orientation. This predetermined relative orientation may be accurately reproduced via the cycling and may cause first part-engaging surface 131 and second part-engaging surface 132 to have a reproducible and/or an expected relative orientation, such as the predetermined relative orientation, when compliant end effector 100 is subsequently transitioned to the open orientation, as illustrated in FIG. 14. This may permit reliable and/or reproducible gripping of a part, such as part 80 of FIGS. 1-4, by compliant end effectors 100 that are described herein.

FIG. 15 is a flowchart depicting methods 200, according to the present disclosure, of automated aircraft component assembly. Methods 200 include locating an apparatus with a vision system at 205 and locating a part with the vision system at 210. Methods 200 further may include cycling a compliant end effector at 215 and include gripping the part with the compliant end effector at 220. Methods 200 also may include regulating a gripping force at 225 and include positioning the part relative to the apparatus at 230. Methods 200 further may include deliberately contacting a toe end of a flange to a surface of the apparatus at 235, providing an overdrive at 240, and/or maintaining operative contact between the part and the apparatus at 245 and include operatively attaching the part to the apparatus at 250. Methods 200 also may include releasing the part at 255 and/or repeating the methods at 260.

Locating the apparatus with the vision system at 205 may include observing the apparatus and/or quantifying a location of at least a portion of the apparatus within the vision system. The vision system may be associated with and/or may form a portion of a robot that performs methods 200 and/or that is configured for automated aircraft component assembly. This may include operatively aligning the part with a surface of the apparatus for, or to permit, operative attachment of the part to the apparatus.

As an example, the locating at 205 may include locating a datum of, on, and/or defined by the apparatus. As an example, the datum of the apparatus may include and/or be a determinant assembly of the apparatus and/or a hole in the assembly. The hole in the apparatus may be configured to receive a fastener during the operatively attaching at 250. As another example, the locating the datum of the assembly additionally or alternatively may include generating a first coordinate system that is defined with respect to the apparatus.

Locating the part with the vision system at 210 may include observing the part and/or quantifying a location of at least a portion of the part with the vision system. As an example, the locating at 205 may include locating a datum of, on, and/or defined by the part. As an example, the datum of the part may include and/or be a determinant assembly of the part and/or a hole in the part. The hole in the part may be configured to receive the fastener during the operatively attaching at 250. As another example, the locating the datum of the part additionally or alternatively may include generating a second coordinate system that is defined with respect to the part.

Cycling the compliant end effector at 215 may include cycling the compliant end effector between an open orientation and a gripping orientation. The cycling at 215 may include aligning, or cycling to align, a first part-engaging surface of the compliant end effector with a second part-engaging surface of the compliant end effector. Additionally or alternatively, the cycling at 215 also may include establishing, or cycling to establish, a predetermined orientation, or relative orientation, between the first part-engaging surface and the second part-engaging surface. The cycling at 215 may be performed prior to the gripping at 220 and/or may be utilized to align the first part-engaging surface with the second part-engaging surface prior to the gripping at 220, thereby placing the first part-engaging surface and the second part-engaging surface in the predetermined orientation and increasing the reproducibility of the gripping at 220.

As an example, and as discussed herein, the compliant end effector may include a first pivot structure, which is configured to rotate about a first single pivot axis and includes a first pair of spherical bearings, and a second pivot structure, which is configured to rotate about a second single pivot axis and includes a second pair of spherical bearings. Under these conditions, the cycling at 215 may cause the first pivot structure and the second pivot structure both to rotate to a given and/or predetermined angular orientation about the first single pivot axis and the second single pivot axis, respectively. Additional examples of components and/or orientations of the compliant end effector, including the open orientation, the gripping orientation, the first part-engaging surface, and/or the second part-engaging surface are discussed herein.

Gripping the part with the compliant end effector at 220 may include establishing physical contact between the compliant end effector, or between the first and second part-engaging surfaces of the compliant end effector, and the part. The gripping at 220 may be accomplished in any suitable manner. As an example, the gripping at 220 may include transitioning the compliant end effector from the open orientation to the gripping orientation. As another example, the gripping at 220 may include translating the second part-engaging surface toward the first part-engaging surface. As yet another example, the gripping at 220 may include compressing the part between the first part-engaging surface and the second part-engaging surface and/or applying a gripping force to the part with the compliant end effector.

Regulating the gripping force at 225 may include maintaining the gripping force within a predetermined gripping force range, maintaining the gripping force above a minimum gripping force, and/or maintaining the gripping force below a maximum gripping force. Maintaining the gripping force above the minimum gripping force may ensure that the part is firmly gripped by the compliant end effector. In addition, maintaining the gripping force below the maximum gripping force may permit relative motion between the part and the first part-engaging surface and/or between the part and the second part-engaging surface during the providing at 240, thereby permitting the part to pivot such that a heel end of the flange contacts a surface of the apparatus, as discussed in more detail herein.

Positioning the part relative to the apparatus at 230 may include moving the part such that the part is at, or near, a desired location on the apparatus. This may include operatively contacting the part with the apparatus. Additionally or alternatively, the positioning at 230 also may include positioning based, at least in part, on the locating at 205 and/or on the locating at 210. As an example, the positioning at 230 may include aligning the first coordinate system, which is defined with respect to the apparatus, with the second coordinate system, which is defined with respect to the part. As a more specific example, the positioning at 230 may include aligning the determinant assembly of the part with the determinant assembly of the apparatus.

Deliberately contacting the toe end of the flange to the surface of the apparatus at 235 may include contacting the toe end of the flange to the surface of the apparatus prior to contact between the heel end of the flange and the surface of the apparatus. This may include establishing a finite contact angle between the flange and the apparatus immediately subsequent to the contact between the toe end of the flange and the apparatus. Examples of the finite contact angle are disclosed herein. Such a method may provide reproducible, face-to-face contact between the flange and the surface of the apparatus subsequent to the providing at 240, which is discussed in more detail herein.

Providing the overdrive at 240 may be performed subsequent to the positioning at 230 and/or subsequent to the deliberately contacting at 235. As an example, and when the part is being gripped by the compliant end effector, the compliant end effector may be configured to permit limited rotation of the part about a rotational axis. Under these conditions, the overdrive may provide a motive force for rotation and/or pivoting of the part about the rotational axis such that the heel end of the part also contacts the surface of the apparatus and/or such that face-to-face contact is established between the flange and the surface of the apparatus.

The providing at 240 may include moving the compliant end effector toward the apparatus, or toward the surface of the apparatus, by an overdrive distance. Examples of the overdrive distance include overdrive distances of at least 0.1 millimeters (mm), at least 0.2 mm, at least 0.3 mm, at least 0.4 mm, at least 0.5 mm, at least 0.6 mm, at least 0.7 mm, at least 0.8 mm, at least 0.9 mm, at least 1 mm, at least 1.2 mm, at least 1.4 mm, at least 1.6 mm, at least 1.8 mm, and/or at least 2 mm. Additional examples of the overdrive distance include overdrive distances of less than 5 mm, less than 4 mm, less than 3 mm, less than 2 mm, less than 1.8 mm, less than 1.6 mm, less than 1.4 mm, less than 1.2 mm, and/or less than 1 mm.

It is within the scope of the present disclosure that, subsequent to the deliberately contacting at 235 and prior to the providing at 240, the toe end of the flange may define a line of contact with the surface of the apparatus. Under these conditions, the rotational axis may extend parallel, or at least substantially parallel, to the line of contact.

Maintaining operative contact between the part and the apparatus at 245 may include maintaining the operative contact subsequent to the positioning at 230, subsequent to the deliberately contacting at 235, subsequent to the providing at 240, and/or until completion of the operatively attaching at 250. The maintaining at 245 may include maintaining face-to-face contact between the flange and the surface of the apparatus and may include applying a predetermined force to the assembly with the part. The predetermined force may be generated by, or a result of, the providing at 240.

Operatively attaching the part to the apparatus at 250 may include operatively attaching in any suitable manner. As an example, the operatively attaching at 250 may include extending the fastener through the hole in the part and also through the hole in the apparatus. This may include extending a single fastener or extending each of a plurality of fasteners through a respective hole in the part and also through a respective hole in the apparatus. It is within the scope of the present disclosure that the operatively attaching at 250 may include operatively attaching the part to the apparatus with the robot and/or with another robot that is utilized in conjunction with the robot.

Releasing the part at 255 may include releasing the part from the compliant end effector and/or releasing the part while maintaining operative attachment between the part and the apparatus. As examples, the releasing at 255 may include spatially separating the part from the compliant end effector, ceasing physical contact between the part and the compliant end effector, moving the second part-engaging surface away from the first part-engaging surface, transitioning the compliant end effector to the open orientation, and/or permitting the part to relax from a gripped conformation to a released, or attached, conformation.

Repeating the methods at 260 may include repeating any suitable portion of methods 200. As an example, the repeating at 260 may include repeating to operatively attach a second part, or even a plurality of parts, to the apparatus. As a more specific example, the part may be a first part, and the repeating at 260 may include repeating at least the locating at 205, the locating at 210, the gripping at 220, the positioning at 230, and the operatively attaching at 250 to operatively attach a second part to the apparatus.

Illustrative, non-exclusive examples of inventive subject matter according to the present disclosure are described in the following enumerated paragraphs:

A1. A compliant end effector for selectively retaining a part, the compliant end effector comprising:
a base;
a jaw fixedly coupled to the base;
a part-engaging surface; and
a pivot structure that extends between the part-engaging surface and the jaw, wherein the pivot structure is configured to permit limited rotation of the part-engaging surface relative to the jaw about a single pivot axis.

A2. The compliant end effector of paragraph A1, wherein the part-engaging surface is a rigid, or at least substantially rigid, part-engaging surface.

A3. The compliant end effector of any of paragraphs A1-A2, wherein the part-engaging surface is defined by the pivot structure.

A4. The compliant end effector of any of paragraphs A1-A3, wherein the part-engaging surface is defined by a part-engaging pad that is operatively attached to the pivot structure.

A5. The compliant end effector of paragraph A4, wherein the pivot structure operatively couples the part-engaging pad to the jaw.

A6. The compliant end effector of any of paragraphs A4-A5, wherein the part-engaging pad is a metallic, optionally a steel, and further optionally a stainless steel, part-engaging pad.

A7. The compliant end effector of any of paragraphs A1-A6, wherein the part-engaging surface is a vacuum surface configured to selectively retain the part via a vacuum force.

A8. The compliant end effector of any of paragraphs A1-A7, wherein the pivot structure is configured to restrict rotation of the part-engaging surface relative to the jaw about another, or any other, pivot axis.

A9. The compliant end effector of any of paragraphs A1-A8, wherein the pivot structure is configured to restrict rotation of the part-engaging surface relative to the jaw about an, or every, axis that is not coextensive with the single pivot axis.

A10. The compliant end effector of any of paragraphs A1-A9, wherein the pivot structure is configured to permit rotation of the part-engaging surface relative to the jaw only about the single pivot axis.

A11. The compliant end effector of any of paragraphs A1-A10, wherein the pivot structure includes, and optionally is, a pair of spherical bearings.

A12. The compliant end effector of paragraph A11, wherein each spherical bearing of the pair of spherical bearings defines a center of rotation, and further wherein the single pivot axis passes through the center of rotation of each spherical bearing of the pair of spherical bearings.

A13. The compliant end effector of any of paragraphs A11-A12, wherein each spherical bearing of the pair of spherical bearings is arranged along a longitudinal axis of the part-engaging surface.

A14. The compliant end effector of any of paragraphs A11-A13, wherein each spherical bearing of the pair of spherical bearings includes an inner ring, which defines an at least partially spherical outer surface, and an outer ring, which defines an at least partially spherical inner surface, wherein the outer surface of the inner ring is opposed to the inner surface of the outer ring such that the inner ring is permitted to rotate relative to the outer ring about three orthogonal rotational axes.

A15. The compliant end effector of any of paragraphs A1-A14, wherein the pivot structure is configured to permit limited rotation about the single pivot axis over an angular range, optionally wherein the angular range is at least one of:

at least 0.2 degrees, at least 0.4 degrees, at least 0.6 degrees, at least 0.8 degrees, at least 1 degree, at least 1.2 degrees, at least 1.4 degrees, at least 1.6 degrees, at least 1.8 degrees, at least 2 degrees, at least 2.5 degrees, at least 3 degrees, at least 4 degrees, or at least 5 degrees; and less than 15 degrees, less than 12.5 degrees, less than 10 degrees, less than 8 degrees, less than 6 degrees, less than 5 degrees, less than 4 degrees, less than 3 degrees, or less than 2 degrees.

A16. The compliant end effector of any of paragraphs A1-A15, wherein the compliant end effector includes a standoff structure, and further wherein the pivot structure is at least partially, and optionally completely, enclosed within the standoff structure.

A17. The compliant end effector of any of paragraphs A1-A16, wherein the jaw extends from, optionally extends perpendicularly from, and further optionally extends at least substantially perpendicularly from, the base.

A18. The compliant end effector of any of paragraphs A1-A17, wherein the jaw is operatively attached to the base.

A19. The compliant end effector of any of paragraphs A1-A18, wherein the jaw is defined by the base.

A20. The compliant end effector of any of paragraphs A1-A19, wherein the jaw is a metallic jaw.

A21. The compliant end effector of any of paragraphs A1-A20, wherein the jaw is a first jaw, wherein the part-engaging surface is a first part-engaging surface, wherein the pivot structure is a first pivot structure, wherein the single pivot axis is a first single pivot axis, and further wherein the compliant end effector includes a second jaw, a second part-engaging surface, a second pivot structure, and a jaw actuator.

A22. The compliant end effector of paragraph A21, wherein at least one of:

(i) the second jaw is movedly, optionally translatingly, and further optionally rotationally, coupled to the base, via the jaw actuator, such that the second part-engaging surface faces toward the first part-engaging surface;

(ii) the second part-engaging surface is movedly, optionally translatingly, and further optionally rotationally, coupled to the second jaw, via the jaw actuator, such that the second part-engaging surface faces toward the first part-engaging surface;

(iii) the second pivot structure extends between the second part-engaging surface and the second jaw;

(iv) the second pivot structure is configured to permit limited rotation of the second part-engaging surface relative to the second jaw about a second single pivot axis; and (v) the first part-engaging surface and the second part-engaging surface are arranged to operatively grip opposed sides of the part.

A23. The compliant end effector of paragraph A22, wherein the second single pivot axis is parallel, or at least substantially parallel, to the first single pivot axis.

A24. The compliant end effector of any of paragraphs A21-A23, wherein the jaw actuator is configured to selectively transition the compliant end effector among a range of orientations that includes at least an open orientation and a gripping orientation.

A25. The compliant end effector of paragraph A24, wherein, when the compliant end effector is in the open orientation, the first part-engaging surface is relatively distal from the second part-engaging surface.

A26. The compliant end effector of any of paragraphs A24-A25, wherein, when the compliant end effector is in the open orientation, the compliant end effector is configured to permit the part to be located between the first part-engaging surface and the second part-engaging surface.

A27. The compliant end effector of any of paragraphs A24-A26, wherein, when the compliant end effector is in in the gripping orientation, the first part-engaging surface is relatively proximal to the second part-engaging surface.

A28. The compliant end effector of any of paragraphs A24-A27, wherein, when the compliant end effector is in in the gripping orientation, the compliant end effector is configured to grip the part between the first part-engaging surface and the second part-engaging surface.

A29. The compliant end effector of any of paragraphs A21-A28, wherein the jaw actuator includes a linear actuator, and optionally wherein the jaw actuator includes at least one of a pneumatic cylinder, a hydraulic cylinder, a solenoid assembly, a rack and pinion assembly, a lead screw and nut assembly, a ball screw assembly, a linear motor, a linear track and carriage, and a linear guide assembly.

A30. The compliant end effector of any of paragraphs A21-A29, wherein the jaw actuator includes a rotational actuator.

A31. The compliant end effector of any of paragraphs A21-A30, wherein the jaw actuator is configured to restrict, optionally limit, and further optionally block, rotation of the second part-engaging surface.

A32. The compliant end effector of any of paragraphs A21-A31, wherein the jaw actuator is configured to regulate a gripping force applied to the part by the compliant end effector when the part is located between the first part-engaging surface and the second part-engaging surface and the jaw actuator is in the gripping orientation.

A33. The compliant end effector of any of paragraphs A21-A32, wherein the second part-engaging surface includes any of the structures of the part-engaging surface any of paragraphs A2-A7.

A34. The compliant end effector of any of paragraphs A21-A33, wherein the second pivot structure includes any of the structures of the pivot structure of any of paragraphs A8-A16.

A35. The compliant end effector of any of paragraphs A21-A34, wherein the second jaw includes any of the structures of the jaw of any of paragraphs A17-A20.

A36. The compliant end effector of any of paragraphs A1-A34, wherein the base is a rigid, or at least substantially rigid, base.

A37. The compliant end effector of any of paragraphs A1-A36, wherein the base is a metallic base.

B1. A robot for operatively attaching a part to an apparatus, the robot comprising:
 a robotic arm; and
 the compliant end effector of any of paragraphs A1-A37, wherein the compliant end effector is operatively attached to the robotic arm.

B2. The robot of paragraph B1, wherein the robot further includes a vision system operatively coupled to the robotic arm.

B3. The robot of paragraph B2, wherein the vision system is configured to generate a location signal that quantifies a position of the part relative to the apparatus.

B4. The robot of any of paragraphs B1-B3, wherein the robot further includes a controller.

B5. The robot of paragraph B4, wherein the controller is programmed to control the operation of at least one of:
 (i) the robotic arm;
 (ii) the compliant end effector; and
 (iii) a/the vision system.

B6. The robot of any of paragraphs B4-B5, wherein the robot further includes a communication linkage that extends between the controller and at least one of:
 (i) the robotic arm;
 (ii) the compliant end effector; and
 (iii) a/the vision system.

B7. The robot of any of paragraphs B4-B6, wherein the controller is programmed to receive a/the location signal from a/the vision system.

B8. The robot of any of paragraphs B4-B7, wherein the controller is programmed to provide a/the control signal to at least one of the robotic arm and the compliant end effector.

B9. The robot of paragraph B8, wherein the control signal includes at least one of:
 (i) a signal for transitioning the compliant end effector to an/the open orientation;
 (ii) a signal for transitioning the compliant end effector to a/the gripping orientation to grip the part;
 (iii) a signal for moving the robotic arm to a first position for gripping the part;
 (iv) a signal for moving the robotic arm to a second position in which the part is in operative contact with the apparatus; and
 (v) an overdrive signal for pressing the part against the assembly.

B10. The robot of any of paragraphs B4-B9, wherein the controller is programmed to perform any suitable portion of any of the methods of any of paragraphs C1-C41.

B11. The robot of any of paragraphs B1-B10, wherein the apparatus includes an aircraft, or a portion of an aircraft.

B12. The robot of paragraph B11, wherein the part includes a rib post of the aircraft.

B13. The robot of any of paragraphs B1-B12, wherein the robot is configured to operatively contact the part with a surface of the apparatus, and further wherein the single pivot axis is parallel, or at least substantially parallel, to an initial line of contact between the part and the surface of the apparatus when the robot operatively contacts the part with the surface of the apparatus.

C1. A method of automated aircraft component assembly, the method comprising:
 locating an apparatus with a vision system of a robot;
 locating a part with the vision system, wherein the robot is configured to operatively align the part with a surface of the apparatus for operative attachment of the part to the apparatus;
 gripping the part with a compliant end effector of the robot;
 positioning the part relative to the apparatus; and
 operatively attaching the part to the apparatus.

C2. The method of paragraph C1, wherein the locating the apparatus includes locating a datum of the apparatus.

C3. The method of paragraph C2, wherein the datum of the apparatus includes a determinant assembly of the apparatus.

C4. The method of any of paragraphs C2-C3, wherein the datum of the apparatus includes a hole in the assembly that is configured to receive a fastener during the operatively attaching.

C5. The method of any of paragraphs C2-C4, wherein the locating the datum of the apparatus includes generating a first coordinate system that is defined with respect to the apparatus.

C6. The method of any of paragraphs C1-05, wherein the locating the part includes locating a datum of the part.

C7. The method of paragraph C6, wherein the datum of the part includes a determinant assembly of the part.

C8. The method of any of paragraphs C6-C7, wherein the datum of the part includes a hole in the part that is configured to receive a/the fastener during the operatively attaching.

C9. The method of any of paragraphs C6-C8, wherein the locating the datum of the part includes generating a second coordinate system that is defined with respect to the part.

C10. The method of any of paragraphs C1-C9, wherein the gripping includes transitioning the compliant end effector from an open orientation to a gripping orientation.

C11. The method of any of paragraphs C1-C10, wherein the gripping includes translating a second part-engaging surface of the compliant end effector toward a first part-engaging surface of the compliant end effector.

C12. The method of any of paragraphs C1-C11, wherein the gripping includes applying a gripping force to the part with the compliant end effector.

C13. The method of paragraph C12, wherein the method further includes regulating the gripping force to facilitate compliance of the compliant end effector.

C14. The method of any of paragraphs C1-C13, wherein the positioning includes aligning a/the first coordinate system that is defined with respect to the apparatus with a/the second coordinate system that is defined with respect to the part.

C15. The method of any of paragraphs C1-C14, wherein the positioning includes operatively contacting the part with the apparatus.

C16. The method of paragraph C15, wherein the part includes a flange that is configured to extend in face-to-face contact with the apparatus subsequent to the operatively attaching, wherein the flange includes a toe end and a heel end, and further wherein the positioning includes deliberately contacting the toe end of the flange with the apparatus prior to contacting the heel end of the flange with the apparatus.

C17. The method of paragraph C16, wherein, subsequent to contacting the toe end of the flange with the apparatus, the method includes providing an overdrive to the part to contact the heel end of the flange with the apparatus.

C18. The method of any of paragraphs C16-C17, wherein, when the part is being gripped by the compliant end effector, the compliant end effector is configured to permit limited rotation of the part about a rotational axis, and further wherein the providing an overdrive includes providing a motive force for the part to rotate the part thereby permitting the heel end of the flange to contact the apparatus.

C19. The method of paragraph C18, wherein, subsequent to contacting the toe end of the flange with the apparatus and prior to contacting the heel end of the flange with the apparatus, the toe end of the flange defines a line of contact with the surface of the apparatus, and further wherein the rotational axis extends parallel, or at least substantially parallel, to the line of contact.

C20. The method of any of paragraphs C16-C19, wherein the providing the overdrive to the part includes moving the compliant end effector toward the apparatus by a distance of at least one of:
(i) at least 0.1 millimeters (mm), at least 0.2 mm, at least 0.3 mm, at least 0.4 mm, at least 0.5 mm, at least 0.6 mm, at least 0.7 mm, at least 0.8 mm, at least 0.9 mm, at least 1 mm, at least 1.2 mm, at least 1.4 mm, at least 1.6 mm, at least 1.8 mm, or at least 2 mm; and
(ii) less than 5 mm, less than 4 mm, less than 3 mm, less than 2 mm, less than 1.8 mm, less than 1.6 mm, less than 1.4 mm, less than 1.2 mm, or less than 1 mm.

C21. The method of any of paragraphs C16-C20, wherein the deliberately contacting includes establishing a finite angle between the flange and the apparatus immediately subsequent to contact between the toe end of the flange and the apparatus.

C22. The method of paragraph C21, wherein the finite angle is at least one of:
(i) at least 0.1 degrees, at least 0.2 degrees, at least 0.3 degrees, at least 0.4 degrees, at least 0.5 degrees, at least 0.6 degrees, at least 0.7 degrees, at least 0.8 degrees, at least 0.9 degrees, at least 1 degree, at least 1.2 degrees, at least 1.4 degrees, at least 1.6 degrees, at least 1.8 degrees, or at least 2 degrees; and
(ii) less than 10 degrees, less than 9 degrees, less than 8 degrees, less than 7 degrees, less than 6 degrees, less than 5 degrees, less than 4 degrees, less than 3.5 degrees, less than 3 degrees, less than 2.8 degrees, less than 2.6 degrees, less than 2.4 degrees, less than 2.2 degrees, or less than 2 degrees.

C23. The method of any of paragraphs C1-C22, wherein the operatively attaching includes extending a/the fastener through a/the hole in the part and also through a/the hole in the apparatus.

C24. The method of any of paragraphs C1-C23, wherein the operatively attaching includes operatively attaching with the robot.

C25. The method of any of paragraphs C1-C24, wherein the operatively attaching includes operatively attaching with another robot that is utilized in conjunction with the robot.

C26. The method of any of paragraphs C1-C25, wherein the positioning includes establishing operative contact between the part and the apparatus, and further wherein the method includes maintaining the operative contact during the operatively attaching.

C27. The method of paragraph C26, wherein the maintaining includes applying a predetermined force to the assembly with the part.

C28. The method of any of paragraphs C26-C27, wherein, subsequent to the establishing operative contact, the method further includes providing an overdrive and moving the part toward the apparatus with the robot to establish an overdrive force between the part and the robot.

C29. The method of any of paragraphs C1-C28, wherein at least one of:
(i) the compliant end effector includes a/the first part-engaging surface, a/the second part-engaging surface, a first pivot structure, and a second pivot structure;
(ii) the first pivot structure is configured to permit limited rotation of the first part-engaging surface about a first single pivot axis;
(iii) the second pivot structure is configured to permit limited rotation of the second part-engaging surface about a second single pivot axis;
(iv) the first part-engaging surface is opposed to the second part-engaging surface;
(v) the first part-engaging surface and the second part-engaging surface together are configured to grip the part during the gripping; and
(vi) the first single pivot axis and the second single pivot axis are parallel, or at least substantially parallel.

C30. The method of any of paragraphs C1-C29, wherein, prior to the gripping, the method further includes cycling the compliant end effector between an open orientation and a gripping orientation.

C31. The method of paragraph C30, wherein the cycling includes cycling to align a/the first part-engaging surface of the compliant end effector with a/the second part-engaging surface of the compliant end effector.

C32. The method of any of paragraphs C30-C31, wherein the cycling includes cycling to establish a predetermined orientation between a/the first part-engaging surface of the compliant end effector with a/the second part-engaging surface of the compliant end effector.

C33. The method of any of paragraphs C1-C32, wherein the part is a first part, and further wherein the method includes repeating at least a portion of the method to locate a second part within the vision system, grip the second part, position the second part, and operatively attach the second part.

C34. The method of any of paragraphs C1-C33, wherein the method further includes repeating at least a portion of the method to operatively attach a second part, and optionally a plurality of parts, to the apparatus.

C35. The method of any of paragraphs C1-C34, wherein, subsequent to the operatively attaching, the method further includes releasing the part from the compliant end effector.

C36. The method of paragraph C35, wherein the releasing includes spatially separating the part from the compliant end effector.

C37. The method of any of paragraphs C35-C36, wherein the releasing includes ceasing physical contact between the part and the compliant end effector.

C38. The method of any of paragraphs C35-C37, wherein the releasing includes moving a/the second part-engaging surface of the compliant end effector away from a/the first part-engaging surface of the compliant end effector.

C39. The method of any of paragraphs C35-C38, wherein the releasing includes permitting the part to relax from a gripped conformation to a released conformation.

C40. The method of any of paragraphs C1-C39, wherein the compliant end effector includes the compliant end effector of any of paragraphs A1-A37.

C41. The method of any of paragraphs C1-C40, wherein the robot includes the robot of any of paragraphs B1-B13.

D1. The use of the compliant end effector of any of paragraphs A1-A37 or the robot of any of paragraphs B1-B13 with the method of any of paragraphs C1-C41.

D2. The use of the method of any of paragraphs C1-C41 with the compliant end effector of any of paragraphs A1-A37 or the robot of any of paragraphs B1-B13.

D3. The use of the compliant end effector of any of paragraphs A1-A37, the robot of any of paragraphs B1-B13, or the method of any of paragraphs C1-C41 to assembly at least one of an aircraft, a portion of an aircraft, and a rib post of an aircraft.

D4. The use of the compliant end effector of any of paragraphs A1-A37, the robot of any of paragraphs B1-B13, or the method of any of paragraphs C1-C41 to operatively locate a rib post within an airplane wing assembly.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of automated aircraft component assembly, the method comprising:
   locating an apparatus with a vision system of a robot;
   locating a part with the vision system, wherein the robot is configured to operatively align the part with a surface of the apparatus for operative attachment of the part to the apparatus;
   gripping the part with a compliant end effector of the robot;
   positioning the part relative to the apparatus; and
   operatively attaching the part to the apparatus, wherein:
   (i) the positioning includes operatively contacting the part with the apparatus;
   (ii) the part includes a flange that is configured to extend in face-to-face contact with the apparatus subsequent to the operatively attaching;
   (iii) the flange includes a toe end and a heel end; and
   (iv) the positioning includes deliberately contacting the toe end of the flange with the apparatus prior to contacting the heel end of the flange with the apparatus.

2. The method of claim 1, wherein, subsequent to the contacting the toe end of the flange with the apparatus, the method includes providing an overdrive to the part to contact the heel end of the flange with the apparatus.

3. The method of claim 2, wherein the providing the overdrive to the part includes moving the compliant end effector toward the apparatus by a distance of at least 0.1 millimeters.

4. The method of claim 2, wherein, when the part is being gripped by the compliant end effector, the compliant end effector is configured to permit limited rotation of the part about a rotational axis, and further wherein the providing the overdrive includes providing a motive force for the part to rotate the part thereby permitting the heel end of the flange to contact the apparatus.

5. The method of claim 4, wherein, subsequent to the contacting the toe end of the flange with the apparatus and prior to contacting the heel end of the flange with the apparatus, the toe end of the flange defines a line of contact with the surface of the apparatus, and further wherein the rotational axis extends at least substantially parallel to the line of contact.

6. The method of claim 1, wherein the locating the apparatus includes locating a datum of the apparatus, wherein the datum of the apparatus includes at least one of:
   (i) a determinant assembly of the apparatus; and
   (ii) a hole in the apparatus that is configured to receive a fastener during the operatively attaching.

7. The method of claim 6, wherein the locating the part includes locating a datum of the part, wherein the datum of the part includes at least one of:
   (i) a determinant assembly of the part; and
   (ii) a hole in the part that is configured to receive the fastener during the operatively attaching.

8. The method of claim 7, wherein the locating the datum of the apparatus includes generating a first coordinate system that is defined with respect to the apparatus, wherein the locating the datum of the part includes generating a second coordinate system that is defined with respect to the part, and further wherein the positioning includes aligning the first coordinate system with the second coordinate system.

9. The method of claim 1, wherein the gripping includes applying a gripping force to the part with the compliant end effector, and further wherein the method includes regulating the gripping force to facilitate compliance of the compliant end effector.

10. The method of claim 1, wherein the operatively attaching includes extending a fastener through a hole in the part and also through a hole in the apparatus.

11. The method of claim 1, wherein the operatively attaching includes at least one of:
(i) operatively attaching with the robot; and
(ii) operatively attaching with another robot that is utilized in conjunction with the robot.

12. The method of claim 1, wherein the positioning includes establishing operative contact between the part and the apparatus, and further wherein the method includes maintaining the operative contact during the operatively attaching.

13. The method of claim 12, wherein the maintaining includes applying a predetermined force to the assembly with the part.

14. The method of claim 12, wherein, subsequent to the establishing operative contact, the method further includes providing an overdrive and moving the part toward the apparatus with the robot to establish an overdrive force between the part and the robot.

15. The method of claim 1, wherein, prior to the gripping, the method further includes cycling the compliant end effector between an open orientation and a gripping orientation.

16. The method of claim 15, wherein the cycling includes cycling to at least one of:
(i) align a first part-engaging surface of the compliant end effector with a second part-engaging surface of the compliant end effector; and
(ii) establish a predetermined orientation between the first part-engaging surface of the compliant end effector with the second part-engaging surface of the compliant end effector.

17. The method of claim 1, wherein, subsequent to the operatively attaching, the method further includes releasing the part from the compliant end effector.

18. The method of claim 17, wherein the releasing includes at least one of:
(i) spatially separating the part from the compliant end effector;
(ii) ceasing physical contact between the part and the compliant end effector;
(iii) moving a second part-engaging surface of the compliant end effector away from a first part-engaging surface of the compliant end effector; and
(iv) permitting the part to relax from a gripped conformation to a released conformation.

19. The method of claim 1, wherein the compliant end effector includes:
a base;
a jaw fixedly coupled to the base;
a part-engaging surface; and
a pivot structure that extends between the part-engaging surface and the jaw, wherein the pivot structure is configured to permit limited rotation of the part-engaging surface relative to the jaw about a single pivot axis; and
wherein, subsequent to the deliberately contacting, the method further includes pivoting the compliant end effector about the single pivot axis to permit the heel end of the flange to contact the apparatus.

20. The method of claim 19, wherein the robot further includes a robotic arm, wherein the compliant end effector is operatively attached to the robotic arm.

* * * * *